United States Patent
Piscopo, Jr.

(10) Patent No.: US 10,667,230 B2
(45) Date of Patent: *May 26, 2020

(54) COMMUNICATION SESSION REGISTRATION- AND SUBSIDIARY-REQUEST PROCESSING

(71) Applicant: T-Mobile USA, Inc., Bellevue, WA (US)

(72) Inventor: Robert F. Piscopo, Jr., Bellevue, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/150,928

(22) Filed: Oct. 3, 2018

(65) Prior Publication Data

US 2019/0037517 A1 Jan. 31, 2019

Related U.S. Application Data

(63) Continuation of application No. 15/072,653, filed on Mar. 17, 2016, now Pat. No. 10,117,211.

(51) Int. Cl.
*H04W 60/00* (2009.01)
*H04L 29/06* (2006.01)
(Continued)

(52) U.S. Cl.
CPC ......... *H04W 60/005* (2013.01); *H04L 65/105* (2013.01); *H04L 65/1006* (2013.01);
(Continued)

(58) Field of Classification Search
CPC .... E03B 1/042; E03B 2001/045; E03B 7/045; H04L 65/1006; H04L 65/1016;
(Continued)

(56) References Cited

U.S. PATENT DOCUMENTS

2004/0199641 A1 10/2004 Bajko
2007/0011342 A1 1/2007 Rosenberg
(Continued)

FOREIGN PATENT DOCUMENTS

| CN | 101056304 | 10/2007 |
|---|---|---|
| WO | WO2009097352 | 8/2009 |
| WO | WO2016022486 | 2/2016 |

OTHER PUBLICATIONS

"802.11 Association Process Explained", Cisco, Meraki, retrieved Jan. 27, 2017 from <<https://documentation.meraki.com/MR/WiFi_Basics_and_Best_Practices/802.11_Association_process_explained >>, 2 pages.
(Continued)

*Primary Examiner* — Timothy X Pham
(74) *Attorney, Agent, or Firm* — Lee & Hayes, P.C.

(57) ABSTRACT

In some implementations, a telecommunications network can include a core network device communicatively connectable with user equipment (UE). The UE can generate a registration request including a subsidiary request and transmit the registration request. The core network device can receive the registration request, determine the subsidiary request based on content of the registration request, and transmit an indication of the subsidiary request on behalf of the UE via the telecommunications network. A core network device can receive a registration request associated with a user equipment (UE), determine a subsidiary request based on content of the registration request, and transmit toward the UE an acknowledgement associated with both the registration request and the subsidiary request.

20 Claims, 9 Drawing Sheets

(51) Int. Cl.
  *H04W 60/06* (2009.01)
  *H04W 80/10* (2009.01)
  *H04W 88/02* (2009.01)

(52) U.S. Cl.
  CPC ...... *H04L 65/1016* (2013.01); *H04L 65/1073* (2013.01); *H04W 60/00* (2013.01); *H04W 60/06* (2013.01); *H04W 80/10* (2013.01); *H04W 88/02* (2013.01)

(58) Field of Classification Search
  CPC .. H04L 65/105; H04L 65/1073; H04W 60/00; H04W 60/005; H04W 60/06; H04W 80/10; H04W 88/02; Y02A 20/148
  USPC ........................................................ 455/345.1
  See application file for complete search history.

(56) References Cited

U.S. PATENT DOCUMENTS

| | | | |
|---|---|---|---|
| 2009/0111427 A1 | 4/2009 | Mack et al. | |
| 2009/0190577 A1 | 7/2009 | Allen et al. | |
| 2009/0225746 A1 | 9/2009 | Jackson et al. | |
| 2009/0247348 A1 | 10/2009 | Haupt et al. | |
| 2010/0216430 A1 | 8/2010 | Brown et al. | |
| 2011/0035446 A1* | 2/2011 | Goermer | H04M 15/83 709/204 |
| 2014/0289348 A1 | 9/2014 | Allen et al. | |
| 2015/0088987 A1 | 3/2015 | Cai et al. | |
| 2015/0282108 A1 | 10/2015 | Kiss | |
| 2015/0350983 A1 | 12/2015 | Kwok et al. | |
| 2015/0381601 A1 | 12/2015 | Toshniwal et al. | |
| 2016/0105551 A1 | 4/2016 | Rameil-Green | |
| 2016/0278037 A1 | 9/2016 | Kiss | |
| 2017/0041768 A1 | 2/2017 | Pattan et al. | |
| 2017/0273046 A1 | 9/2017 | Piscopo, Jr. | |
| 2018/0176876 A1 | 6/2018 | Alam | |

OTHER PUBLICATIONS

"Cisco Secure Services Client Administrator Guide, Release 5.1", Oct. 19, 2013, retrieved Jan. 27, 2017 from <<http://www.cisco.com/c/en/us/td/docs/wireless/wlan_adapter/secure_client/5-1/administration/guide/SSC_Admin_Guide_5_1/C1_Network_Security.html>>, 15 pages.
Dukinfield, D., "Service Provider Wi-Fi Integration", Cisco, 2013-2014, retrieved from <<http://www.mobilitydg.org/wp-content/uploads/2015/01/02-SP-WiFi-Architectures-MDG-d2.pdf>>, 22 pages.
"ETSI TS 123 003 v 13.5.0" , Apr. 2016, pp. 1, 24-27, and 71-73.
"ETSI TS 123 167 v 12.1.0", Mar. 2015, pp. 1, 3-4, 8-21, 24-26 and 39.
"ETSI TS 123 228 v 12.8.0", Mar. 2015, pp. 1, 26-32, 67-74, 82-83, 89-92, and 179-180.
"ETSI TS 123 271 v 12.1.0", Oct. 2014, pp. 1, 19-31, and 40.
"ETSI TS 124 229 v 13.5.1", May 2016, pp. 1, 85-97, 200-221, 223-228, 280-285, 292, and 326-329.
"ETSI TS 136 413 v 13.4.0", Oct. 2016, pp. 1, 77-79, 124, and 148-151.
"J-STD-036-A Enhanced Wireless 9-1-1 Phase 2", Jun. 2002, pp. 1, 9-23, 27-32, and 37-39.
Jennings, C. Request for Comments 5626 , Standards Track, Oct. 2009, pp. 1-18, 21-22, and 49.
"LTE Location-Based Services Technology Introduction", retrieved Oct. 26, 2016 from <<http://rohde-schwarz-wireless.com/documents/LTELBSWhitePaper_RohdeSchwarz.pdf>>, 22 pages.
Niemi, "Session Initiation Protocol (SIP) Extension for Event State Publication," Networking Working Group, Request for Comments 3903, Oct. 2004, 32 pages.
Norell, L., et al., "Wi-Fi Calling-Extending the Reach of VoLTE to Wi-Fi", Ericsson Review, retrieved Oct. 10, 2016 from <<http://www.ericsson.com/res/thecompany/docs/publications/ericsson_review/2015/er-wifi-calling.pdf>>, 8 pages.
Office action for U.S. Appl. No. 15/072,653, dated Jan. 25, 2018, Piscopo, "Communication Session Registration- and Subsidiary Request Processing", 10 pages.
Office action for U.S. Appl. No. 15/072,653, dated Mar. 20, 2017, Piscopo, "Communication Session Registration- and Subsidiary Request Processing", 11 pages.
Office Action for U.S. Appl. No. 15/384,635, dated Sep. 19, 2017, Alam, "Processing Requests in Communication Session" 16 pages
Office action for U.S. Appl. No. 15/072,653, dated Sep. 6, 2017, Piscopo, "Communication Session and Registration- and Subsidiary Request Processing", 14 pages.
PCT Search Report and Written Opinion dated Mar. 29, 2018, for PCT Application No. PCT/US17/66037, 11 pages.
PCT Search Report and Written Opinion dated May 24, 2017 for PCT application No. PCT/US2017/022026, 12 pages.
"Real Time Communication—Third Party Registration", Nov. 17, 2014, retrieved Oct. 25, 2016 from <<https://realtimecommunication.wordpress.com/2014/11/17/third-party-registration/>>, 9 pages.
Roach, "SIP-Specific Event Notification", Internet Engineering Task Force (IETF), Request for Comments 6665, Jul. 2012, 53 pages.
Rosenberg et al., "A Session Initiation Protocol (SIP) Event Package for Conference State", Network Working Group, Request for Comments 4575, Aug. 2006, 48 pages.
Rosenberg et al., "An Invite-Initiated Dialog Event Package for the Session Initiation Protocol (SIP)," Network Working Group, Request for Comments 4235, Nov. 2005, 39 pages.
Rosenberg, J., "Request for Comments 3680", Standards Track, Mar. 2004, 26 pages.
Rosenberg et al., "SIP: Session Initiation Protocol", Network Working Group, Request for Comments 3261, The Internet Society, Jun. 2002, 269 pages.
Shen, C. "A Session Initiation Protocol (SIP) Load-Control Event Package." RFC 7200. Apr. 2014. pp. 14-18.
Spirent.com, "IMS Procedures and Protocols", available at <<http://www.spirent.com/~/media/White%20Papers/Mobile/Protocol_Reference_Guide.pdf>>, 31 pages.
Extended European Search Report dated Jun. 26, 2019 for European Patent Application No. 17767243.3, 8 pages.

* cited by examiner

COMMUNICATION SESSION REGISTRATION- AND SUBSIDIARY-REQUEST PROCESSING

CROSS REFERENCE TO RELATED APPLICATIONS

This application is a continuation of co-pending U.S. application Ser. No. 15/072,653 filed Mar. 17, 2016, entitled "Communication Session Registration- and Subsidiary-Request Processing," which is expressly incorporated herein by reference in its entirety.

BACKGROUND

A computing device configured for telecommunications, such as a wireless smartphone, is generally capable of serving as a user's access point for various communications services. However, each service generally has its own requirements and supporting infrastructure. This can increase complexity of telecommunications devices and reduce network performance.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
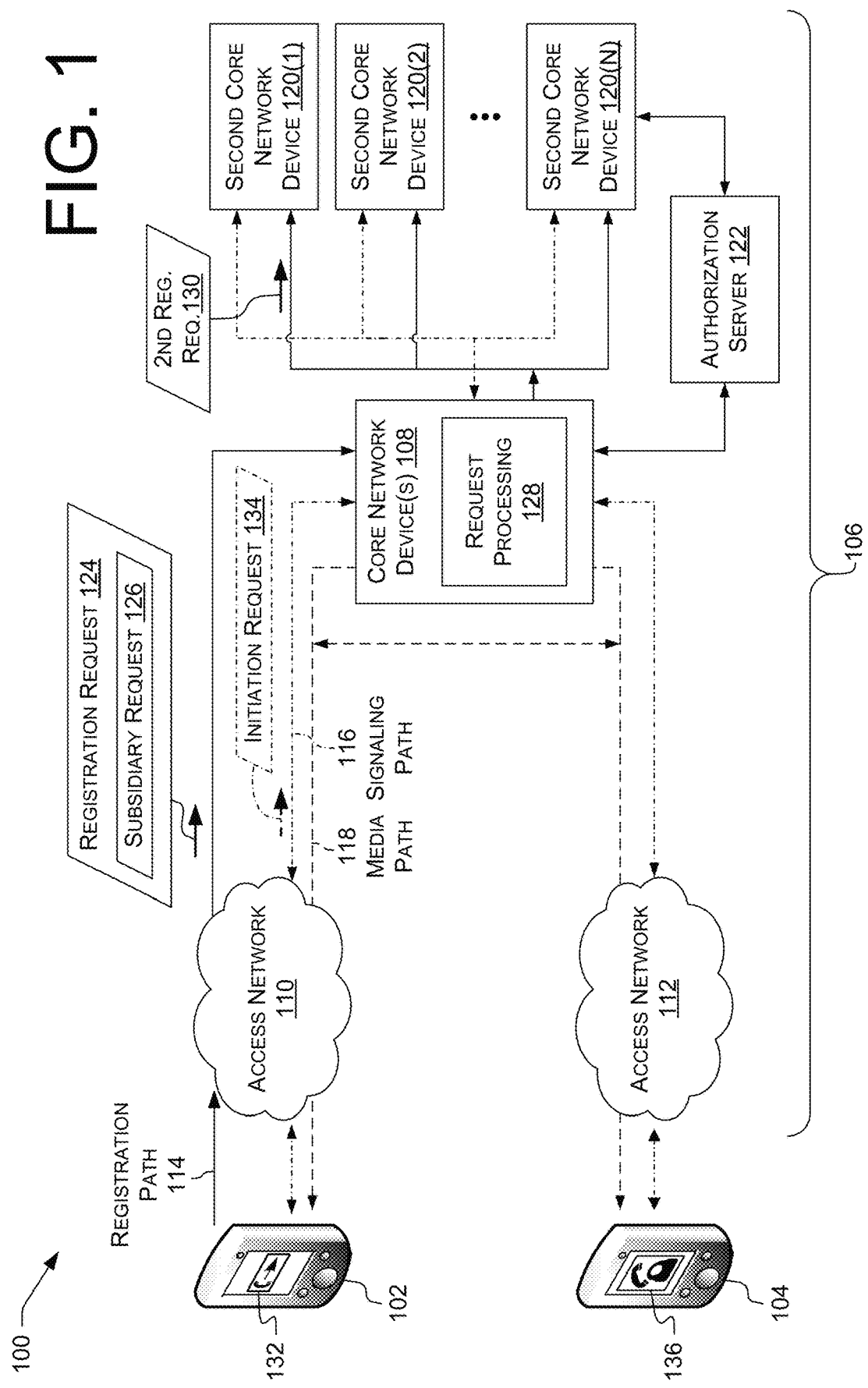
FIG. 1 is a block diagram illustrating a telecommunication system according to some implementations.

Systems and techniques described herein permit computing devices to more rapidly and efficiently communicate via telecommunications networks. The term "session" as used herein includes a communications path via at least one telecommunications network for exchange of data among two or more computing devices. Example sessions include voice and video calls, e.g., by which human beings converse, a data communication session, e.g., between two electronic systems or between an electronic system and a human being, or a Rich Communication Services (RCS, also known as JOYN) session. In many networks, these and other types of sessions are facilitated by respective, different core network devices. Systems and techniques herein permit devices to register for network services provided by multiple such core network devices in a more efficient and robust way than prior schemes.

Many Long Term Evolution (LTE) cellular networks support voice over LTE (VoLTE). VoLTE systems support communications between handsets and one or more application servers (ASes). As a prerequisite to receiving service from a particular AS, A VoLTE handset or other terminal registers with that AS. The VoLTE handset sends a Session Initiation Protocol (SIP) REGISTER message to a serving call session control function (S-CSCF). The S-CSCF transmits SIP REGISTER messages to individual ASes on behalf of the handset. After an AS processes the REGISTER for a handset, that handset can receive service from that AS. Often, handsets also send SIP SUBSCRIBE messages to at least one AS (or the S-CSCF sends SIP SUBSCRIBE messages to at least one AS on behalf of the handset) to receive notification of relevant events, e.g., for presence detection or network-state changes. The SIP REGISTER and SUBSCRIBE messages contain much of the same information and so use unnecessary network bandwidth. Moreover, race conditions between REGISTER and SUBSCRIBE messages can result in failures of the SUBSCRIBE, forcing, e.g., a user of a smartphone to wait extra time before receiving service. As used herein, the term "staged setup" refers to a protocol arrangement in which a core network device must successfully process a first setup or sign-in message, e.g., a SIP REGISTER, before processing of a second setup or sign-in message, e.g., a SIP SUBSCRIBE or PUBLISH message, can succeed.

In some examples, the SIP SUBSCRIBE is replaced by a header in the SIP REGISTER message. The S-CSCF or TAS receiving such a REGISTER message, upon detecting the header, processes a SUBSCRIBE for the handset. This saves bandwidth and eliminates a possible race condition between REGISTER and SUBSCRIBE. In some examples, a computing device can transmit a single REGISTER with implicit SUBSCRIBE to the S-CSCF, and the S-CSCF can fork the REGISTER and corresponding SUBSCRIBEs to multiple ASes. This permits rapidly registering to multiple ASes without risking the above-noted race conditions.

Example networks carrying sessions include second-generation (2G) cellular networks such as the Global System for Mobile Communications (GSM) and third-generation (3G) cellular networks such as the Universal Mobile Telecommunications System (UMTS). Other example networks include fourth-generation (4G) cellular networks, such as LTE carrying VoLTE sessions using SIP signaling, the PSTN using Signaling System 7 (SS7) signaling, and data networks, such as Institute of Electrical and Electronics Engineers (IEEE) 802.11 ("WIFI") networks carrying voice over Internet Protocol (VoIP) calls or other over-the-top (OTT) sessions encapsulating, e.g., voice or video data in a way transparent to an underlying packet transport. Other example networks carrying sessions can include Internet Protocol (IP) Multimedia Subsystem (IMS)-based networks, which can have various types of access networks, e.g., LTE or WIFI access networks. Techniques described herein can be used with these and other types of networks having staged setup processes or protocols.

In some examples, a core network device is communicatively connectable with cellular user equipment (UE) or another computing device or terminal. For example, the core network device can include an S-CSCF. The UE can be configured to generate a registration request including a subsidiary request, and to transmit the registration request, e.g., to the core network device. The core network device can receive the registration request, determine the subsidiary request based on content of the registration request, and transmit an indication of the subsidiary request on behalf of the UE, e.g., to an AS, via the telecommunications network. A core network device, e.g., an S-CSCF or AS, can receive a registration request associated with the UE, determine a subsidiary request based on content of the registration request, and transmit toward the UE an acknowledgement associated with both the registration request and the subsidiary request.

Various examples herein reduce the bandwidth required for staged setup processes. Various examples herein reduce the probability of race conditions between the two phases of a staged setup process.

Illustrative Examples

FIG. 1 is a block diagram illustrating a telecommunication system 100 according to some examples. The system includes computing devices 102 and 104, e.g., user equipment or other mobile phones or communications devices or terminals, communicatively connectable with a telecommunications network 106. The computing devices 102 and 104 can be operated, e.g., by a first user and a second user respectively (not shown). The computing devices 102 and 104 are communicatively connected to one or more core network device(s) 108, e.g., via respective access networks 110 and 112. The core network device(s) 108 can include, e.g., a serving call session control function (S-CSCF) of an IMS in a VoLTE-capable network, or one or more Application Servers (ASes), such as a Telephony Application Server (TAS). For brevity, other components of telecommunications network 106 are omitted. For example, a proxy call session control function (P-CSCF) can relay communications between computing device 102 and core network device 108, e.g., an S-CSCF.

The computing devices 102 and 104 may be implemented as any suitable mobile computing devices configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the computing devices 102 and 104 as being "mobile" or "wireless," (e.g., configured to be carried and moved around), it is to be appreciated that the computing devices 102 and 104 may represent various types of communication devices that are generally stationary as well, such as televisions, desktop computers, game consoles, set top boxes, and the like. In this sense, the terms "communication device," "wireless device," "wireline device," "mobile device," "computing device," "user equipment (UE)," and "terminal" may be used interchangeably herein to describe any communication or computing device capable of performing techniques described herein with respect to, e.g., computing devices 102 and 104. For example, some computing devices can have specific media handling requirements and thus only accept specific media codecs or components in a session description.

Computing devices 102 and 104 can communicate at least three types of information: registration information, signaling information, and media information. Registration information is carried via registration path 114, depicted using solid lines. Signaling information is carried via signaling path 116, depicted using dash-dotted lines. Media information is carried via media path 118, depicted using dashed lines. For brevity, registration path 114 is shown only for computing device 102. Computing device 104 can additionally or alternatively conduct registration signaling via a corresponding registration path.

Registration information can include information useful for establishing that a computing device 102 or 104 is eligible to receive service, e.g., SIP REGISTER or SUBSCRIBE requests or RADIUS or Diameter authentication-protocol messages. Signaling information can include information relating to call setup and teardown, e.g., SIP INVITE or BYE requests, or SIP 100 Trying or 180 Ringing responses. Media information can include audio, video, or other user-specified or -accessible data of a communication session, e.g., carried via the Real-time Transport Protocol (RTP) and encoded using a selected codec. Nonlimiting example codecs can include an adaptive multi-rate (AMR) or International Telecommunications Union (ITU) G.711 audio codec, or an ITU H.263 or Moving Picture Experts Group (MPEG)-4 video or audiovisual codec.

In some examples, core network device 108 is communicatively connected with one or more second core network device(s) 120(1)-120(N) (individually and/or collectively referred to herein with reference 120), for integer N>1, e.g., ASes. Second core network devices 120 can receive registration information via core network device 108. Second core network devices 120 can additionally or alternatively receive signaling information via core network device 108. In some examples, second core network devices 120 can serve as anchoring network devices, which proxy signaling traffic for communication session(s). For example, a second core network device 120 can operate as a SIP proxy or back-to-back user agent (B2BUA). In some examples, a second core network device 120 (or other anchoring network device, and likewise throughout) can provide session-control services to computing devices 102 or 104. In some examples, core network device 108 or a second core network device 120 can be configured to communicate with an authorization server 122, e.g., a home location register (HLR)/home subscriber server (HSS). Core network devices 108 or 120 can communication with authorization server 122, e.g., via the Diameter protocol, e.g., over the LTE Sh interface or other appropriate interfaces.

When computing device 102 powers up or connects to the telecommunications network, computing device 102 can transmit a registration request 124, e.g., via registration path 114. For example, registration request 124 can include a SIP REGISTER request. As used herein, the term "request" signifies a message transmission to which a response is expected for normal functioning of network service(s) associated with the request. For example, computing device 102 can transmit a SIP REGISTER request and then expect a SIP 401 Unauthorized or SIP 200 OK response indicating the status of an attempted registration included in the REGISTER request.

As used herein, a message "transmitted to" or "transmitted toward" a destination, or similar terms, can be transmitted directly to the destination, or can be transmitted via one or more intermediate network devices to the destination. In the illustrated example, computing device 102 transmits registration request 124 to core network device 108 via access network 110. Similarly, a message "received from" a destination can be received directly from the destination, or can be received via one or more intermediate network devices from the destination. In the illustrated example, core network device 108 receives registration request 124 from computing device 102 via access network 110. A message passing through one or more intermediate network devices can be modified by those network devices, e.g., by adding or removing framing, or by changing a presentation of the message, e.g., from a SIP start-line to a SIP header or vice versa.

Registration request 124 can include, e.g., registration information associated with computing device 102. Registration information can include identification information or authorization information. Identification information can include, e.g., a terminal identifier such as an international mobile equipment identity (IMEI), a user identifier such as an international mobile subscriber identity (IMSI), a network identifier such as a mobile country code (MCC) and a mobile network code (MNC), a user address such as an ITU E.164 international-dialing-plan telephone number, mobile station international subscriber directory number (MSISDN), or network address, such as an Internet IPv4 or IPv6 address, or a country code, e.g., indicating a country in which computing device 102 is located. Authorization information can include, e.g., a username, password, password hash, challenge response, cryptographic ticket, or other information usable by authorization server 122, e.g., independently or in association with the identification information, to determine access to services of telecommunications network 106 that should be provided to computing device 102. Registration information can be included in, or determined based at least in part on, service information 224 in some examples.

The registration request 124 can include a subsidiary request 126. Subsidiary request 126 can include data corresponding to, e.g., a SIP SUBSCRIBE request or a SIP PUBLISH request. In some examples, subsidiary request 126 can include a request contingent for its success on the success of registration request 124. For example, some network architectures require that a SIP REGISTER be successfully processed, so that computing device 102 is authenticated to core network device 108, before a SIP SUBSCRIBE from computing device 102 can be successfully processed.

In some examples, a SIP SUBSCRIBE request causes second core network device 120 to notify computing device 102 when particular events occur, those events being defined within an "event package." In some examples, a SIP PUBLISH request conveys information about a state of computing device 102, e.g., with respect to events defined in an event package, to second core network device 120. A SIP PUBLISH, for example, can convey information about presence, handset capabilities, supported codecs, or handset location.

In some examples, subsidiary request 126 can be included within registration request 124 or otherwise associated with registration request 124. For example, subsidiary request 126 can include at least one of a SIP header or a SIP message body in the registration request 124. An example subsidiary request 126 for subscribing to the SIP "dialog" and "reg" event packages can be a SIP header "P-Implicit-Subscribe: dialog, reg". Example subsidiary requests 126 can include, e.g., an XML, representation of a SUBSCRIBE, PUBLISH, or other request included as a message body of registration request 124. Example subsidiary requests 126 can include, e.g., the full text of a request, e.g., a SUBSCRIBE or PUBLISH request, included as a message body of registration request 124.

Core network device 108, upon receiving registration request 124, can perform request processing 128, described below in more detail with reference to FIGS. 2-10. For example, core network device 108 can determine the subsidiary request 126 associated with registration request 124. Core network device 108 can then transmit an indication of the subsidiary request 126, e.g., to one or more second core network devices 120. The indication of the subsidiary request 126 can include, e.g., separate requests representing, respectively, registration request 124 and subsidiary request 126, e.g., transmitted in that order, or can include a combined request corresponding to both registration request 124 and subsidiary request 126. In some examples, core network device 108 can determine, e.g., using initial filter criteria (iFCs), which second core network device(s) 120 should receive registration request 124. Core network device 108 can then fork registration request 124, including subsidiary request 126, to at least some of those second core network device(s) 120. An example second registration request 130 is shown, which can represent a fork of registration request 124 and can include an indication of at least some of subsidiary request 126.

Core network device 108 or 120, upon receiving registration request 124, can determine the subsidiary request 126 associated with registration request 124. Core network device 108 or 120 can then transmit an acknowledgement associated with both the registration request and the subsidiary request. For example, second core network device 120 can transmit a SIP 200 OK in response to registration request 124, and include in the SIP 200 OK a header such as "P-Implicit-Subscribe: reg" indicating, in this example, that the subsidiary request 126 of a SUBSCRIBE to the "reg" event package was successful. Core network device 108 can transmit acknowledgements to computing device 102 on its own behalf, or on behalf of second core network device(s) 120. For example, core network device 108 can fork the registration request 124 to one or more second core network device(s) 120, await acknowledgements from those second core network device(s) 120, and then transmit an acknowledgement to computing device 102 indicating success of the registration request 124 and the (forked) second registration request(s) 130. Functions described throughout this document in relation to acknowledgements can additionally or alternatively be performed for error messages, unless otherwise expressly noted.

Subsequent to registering, the first user may place a call to (i.e., establish a communication session with) the second user. The computing device 102, e.g., in response to actuation by the second user of a "Send" control 132, can transmits an initiation request 134 of a communication session, e.g., a SIP INVITE. The computing device 102 in this example is a session-originating device, i.e., a computing device initiating a communication session with another computing device. Session-originating devices can include user equipment or other telecommunications or computing devices communicatively connectable with other computing devices via one or more core network device(s) 108. Mobile phones and copper-loop landline phones can be examples of session-originating devices.

The initiation request 134, e.g., representing an outgoing voice call, can includes information of at least one destination, e.g., at least one computing device or other telecommunication device (e.g., computing device 104) with which computing device 102 is requesting a session be established.

At least one second core network device 120 can process the initiation request 134, e.g., according to or based at least in part on information in registration request 124 or subsidiary request 126. At least one second core network device 120 can further, in response to the initiation request 134 or subsequent processing, transmit notification messages such as SIP NOTIFY messages. In an example, subsidiary request 126 corresponds to a SIP SUBSCRIBE for the "dialog" event package. When a SIP dialog anchored at second core network device 120(1) is established, second core network device 120(1) can transmit a SIP NOTIFY message to computing device 102 indicating the establishment.

Call initiation can be performed, e.g., as defined in the Global System for Mobile (GSM) or voice-over-Long Term Evolution (VoLTE) standards, and can include the exchange of additional messages (not shown) between the computing devices 104 and 102 and the core network device(s) 108 or 120. For example, the user of computing device 104 can operate a call-acceptance control 136 such as a touchscreen button. Computing device 104 can then transmit a SIP 200 OK response to a SIP INVITE message. Once the session is established, data of the session, such as audio data or video data, can be exchanged between computing devices 104 and 102 via a communications channel depicted as media path 118. As shown, media path 118 can pass through core network device(s) 108 or 120 or can bypass core network device(s) 108 and 120.

Figure 2:
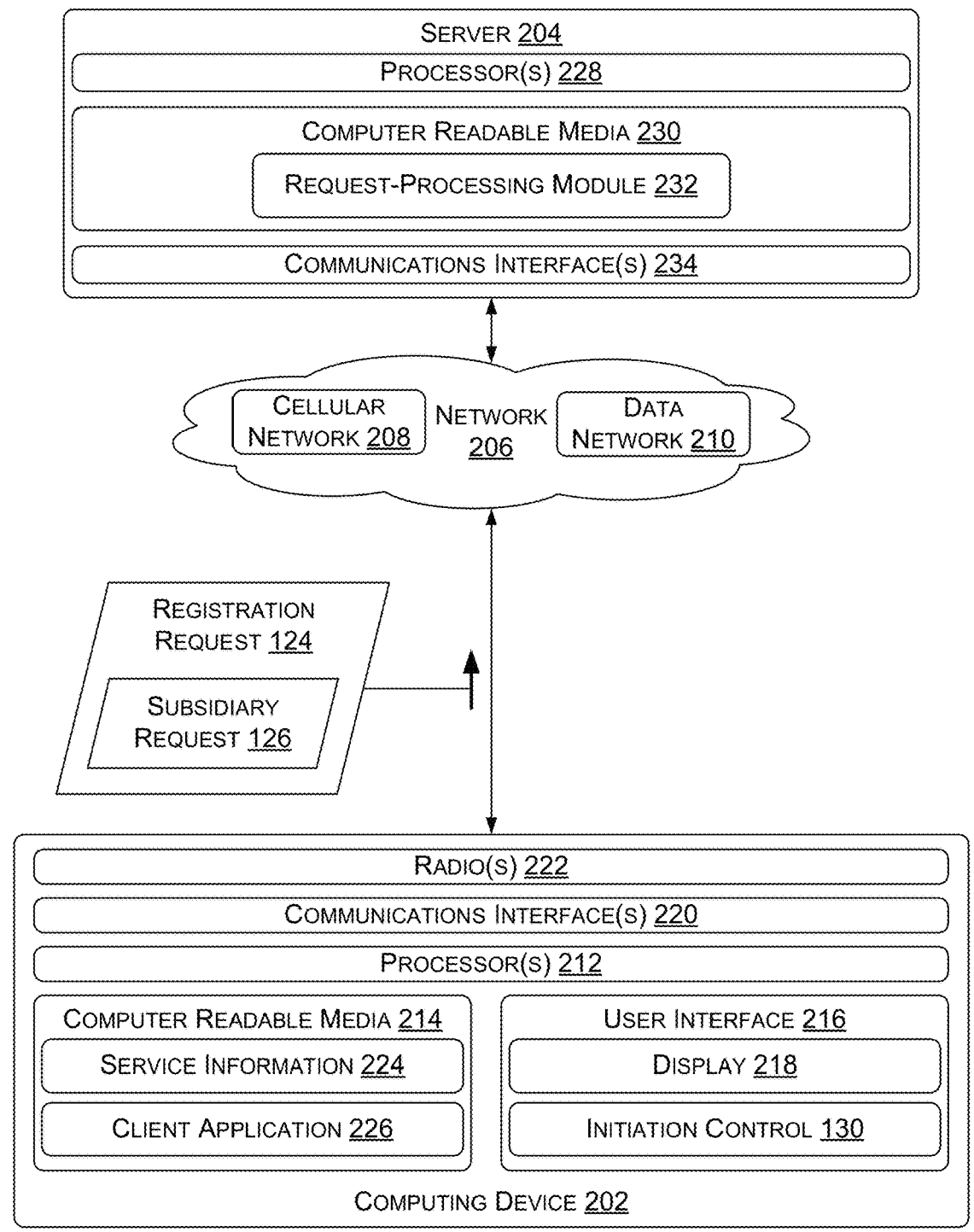
FIG. 2 is a block diagram illustrating components of a telecommunication system according to some implementations.

FIG. 2 is a block diagram illustrating a system 200 permitting subsidiary-request processing according to some implementations. The system 200 includes a computing device 202, e.g., a wireless phone or other user equipment, which can represent computing device 102 or 104, FIG. 1. Computing device 202 can be coupled to a server 204 via a telecommunications network 206. The server 204 can be an example of the core network device(s) 108 or 120, FIG. 1, e.g., an S-CSCF, TAS, or other AS.

The network 206 can include one or more networks, such as a cellular network 208 and a data network 210. The network 206 can include one or more core network(s) connected to user equipment via one or more access network(s). Example access networks include LTE, WIFI, GSM EDGE Radio Access Network (GERAN), UMTS Terrestrial Radio Access Network (UTRAN), and other cellular access networks.

The cellular network 208 can provide wide-area wireless coverage using a technology such as GSM, Code Division Multiple Access (CDMA), UMTS, LTE, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. Communications between the server 204 and computing devices such as the computing device 202 can additionally or alternatively be performed using other technologies, such as wired (Plain Old Telephone Service, POTS, or PSTN lines), optical (e.g., Synchronous Optical NETwork, SONET) technologies, and the like.

The data network 210 can include various types of networks for transmitting and receiving data (e.g., data packets), including networks using technologies such as WIFI, IEEE 802.15.1 (BLUETOOTH), Asynchronous Transfer Mode (ATM), WIMAX, and other network technologies, e.g., configured to transport Internet Protocol (IP) packets. In some examples, the server 204 includes or is communicatively connected with an interworking function (IWF) or other device bridging networks, e.g., LTE, 3G, and POTS networks. In some examples, the server 204 can bridge SS7 traffic from the PSTN into the network 206, e.g., permitting PSTN customers to place calls to cellular customers and vice versa.

In some examples, the cellular network 208 and the data network 210 can carry voice or data. For example, the data network 210 can carry voice traffic using Voice over Internet Protocol (VoIP) or other technologies as well as data traffic, or the cellular network 208 can carry data packets using High Speed Packet Access (HSPA), LTE, or other technologies as well as voice traffic. Some cellular networks 208 carry both data and voice in a packet-switched format. For example, many LTE networks carry voice traffic in data packets according to the voice-over-LTE (VoLTE) standard. Various examples herein provide origination and termination of, e.g., carrier-grade voice calls on, e.g., circuit-switched (CS) networks 206 or mixed VoLTE/3G networks 206, and on computing devices 202 including original equipment manufacturer (OEM) handsets, non-OEM handsets, or computing devices running over-the-top (OTT) SIP client software.

The computing device 202 can be or include a wireless phone, a wired phone, a tablet computer, a laptop computer, a wristwatch, or other type of computing device. The computing device 202 can include at least one processor 212, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media 214, such as memory (e.g., random access memory (RAM), solid state drives (SSDs), or the like), disk drives (e.g., platter-based hard drives), another type of computer-readable media, or any combination thereof.

The computing device 202 can further include a user interface (UI) 216, e.g., including an electronic display device 218, a speaker, a vibration unit, a touchscreen, or other devices for presenting information to a user and receiving commands from the user. The user interface 216 can include a session-initiating user interface control 132, e.g., a touchscreen button, to indicate a communication session should be initiated. The user interface 216 or components thereof, e.g., the electronic display device 218, can be separate from the computing device 202 or integrated (e.g., as illustrated in FIG. 1) with the computing device 202.

The computing device 202 can further include one or more communications interface(s) 220 configured to selectively communicate via the network 206. For example, communications interface(s) 220 can operate one or more radio(s) 222 of computing device 202 to communicate via network 206. Radio(s) 222 can, e.g., communicate via access network(s) 110 or 112 of cellular network 208. Communications interface(s) 220 can additionally or alternatively include one or more transceivers or other components configured to communicate using wired connections via the network 206.

The computer readable media 214 can be used to store data and to store components that are operable by the processor 212 or instructions that are executable by the processor 212 to perform various functions as described herein. The computer readable media 214 can store various types of instructions and data, such as an operating system, device drivers, etc. The processor-executable instructions can be executed by the processor 212 to perform the various functions described herein.

The computer readable media 214 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processor 212. Tangible computer-readable media can include volatile and nonvolatile, removable and non-removable media implemented in any method or technology for storage of information, such as computer readable instructions, data structures, program modules, or other data.

The computer readable media 214 can store service information 224 indicating at least one network service the computing device 202 is configured to use. The service information 224 can include, e.g., indications of application servers or service types to which the computing device 202 may attempt to connect. Other examples of service information 224 are discussed below.

The computer readable media 214 can include processor-executable instructions of a client application 226. The client application 226, e.g., a native or other dialer, can permit a user to originate and terminate communication sessions associated with the computing device 202, e.g., wireless phone. In some examples, the client application 226 can cause computing device 202 to transmit at least one of the registration request 124, the subsidiary request 126, or the initiation request 134 to the server 204. The client application 226 can determine at least some of the contents of at least one of the registration request 124, the subsidiary request 126, or the initiation request 134 based at least in part on the service information 224.

The server 204 can include at least one processor 228 and one or more computer readable media (CRM) 230. The computer readable media 230 can be used to store processor-executable instructions of a request-processing module 232, which can represent or perform request processing 128, FIG. 1. The processor-executable instructions can be executed by the processor 228 to perform various functions described herein, e.g., with reference to at least one of FIGS. 4, 5, and 7-10.

The server 204 can include one or more communications interface(s) 234, e.g., of any of the types described above with reference to communications interface(s) 220. For example, server 204 can communicate via communications interface(s) 234 with authorization server 122 or with other core network devices 108 or 120.

Figure 3:
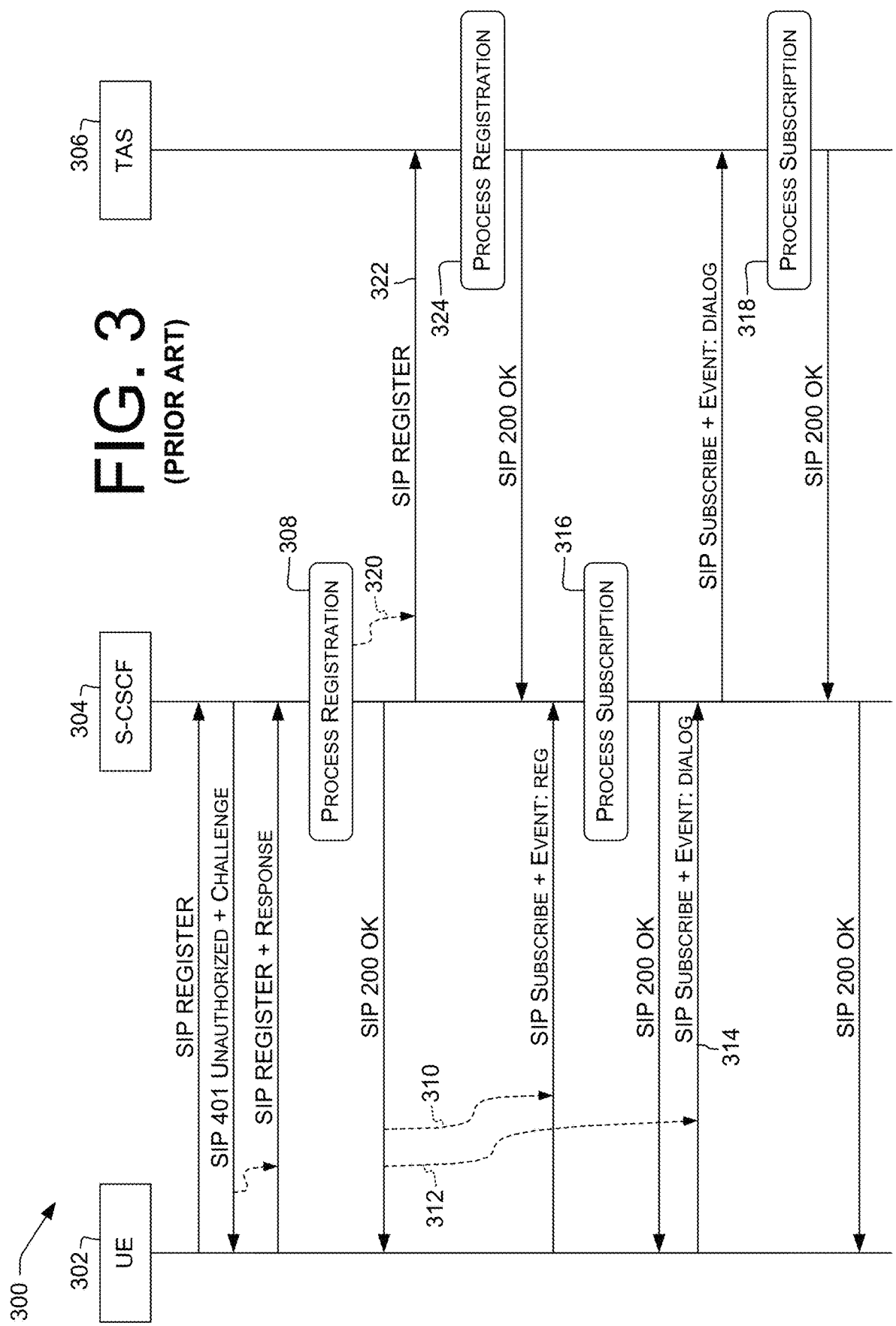
FIG. 3 shows a call flow illustrating an example registration process according to some prior schemes.

FIG. 3 shows a call flow 300 illustrating an example registration process, e.g., from a VoLTE UE 302 to an IMS-based telecommunications network, according to some prior schemes. UE 302, in this example, is registering to an S-CSCF 304 and a telephony application server (TAS) 306. Not all core network devices are shown.

As shown, UE 302 sends a registration request in the form of a SIP REGISTER message. In this example, S-CSCF 304 responds to the REGISTER message with a SIP 401 Unauthorized error and a challenge, e.g., a nonce. In response, as indicated by the dashed arrow, computing device 102 transmits a second SIP REGISTER message including a response to the challenge, e.g., a hash of the nonce and a shared secret.

At block 308, S-CSCF 304 processes the registration. Block 308 can include verifying the response to the challenge to confirm that computing device 102 is authorized to register. S-CSCF 304 then transmits a SIP 200 OK indicating the registration is complete.

As indicated by dashed arrows 310 and 312, in response to the SIP 200 OK, UE 302 transmits two SIP SUBSCRIBE requests: one for the "reg" event package ("Event: reg"), as indicated by arrow 310, and one for the "dialog" event package ("Event: dialog"), as indicated by arrow 312 and message 314. At block 316, S-CSCF 304 processes the "reg" subscription. At block 318, TAS 306 processes the "dialog" subscription. Each of blocks 316 and 318 responds with a SIP 200 OK when the corresponding processing succeeds.

As indicated by arrow 320, in response to the registration in block 308, S-CSCF 304 also forks the registration message to TAS 306, in this example as SIP REGISTER message 322. At block 324, TAS 306 processes message 322. TAS 306 then replies to S-CSCF 304 with a SIP 200 OK.

However, the processing on the UE 302 in response to the registration (arrows 310 and 312) can be performed in parallel with the processing on the S-CSCF 304 and TAS 306 (arrow 320). Therefore, message 314, subscribing to the "dialog" event package, may reach TAS 306 before processing in block 324 is complete. This is a race condition, which may lead to TAS 306 responding with a failure indication, e.g., a SIP 4xx or 5xx response, to message 314.

Figure 4:
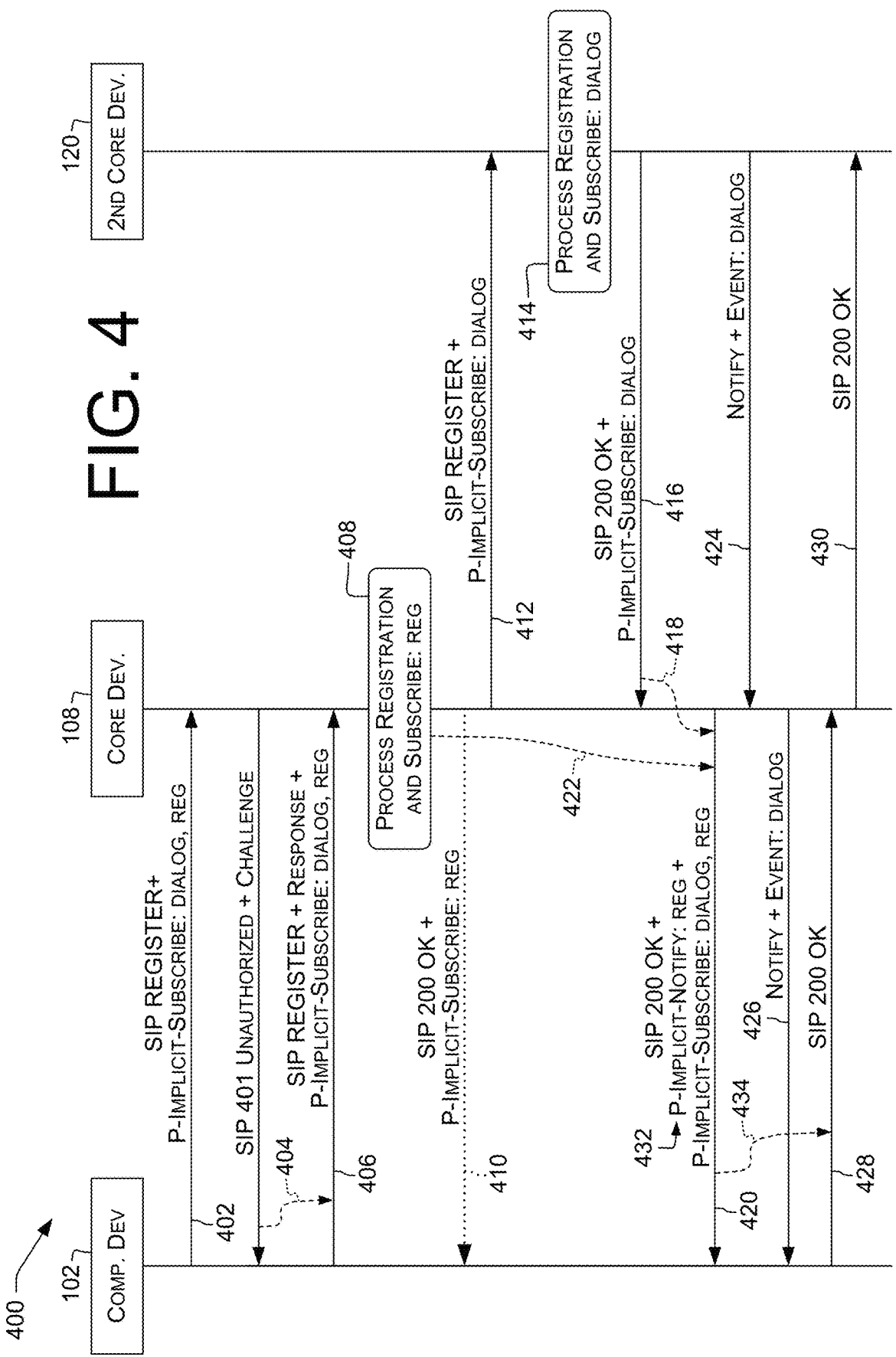
FIG. 4 shows a call flow illustrating an example staged setup according to some implementations.

FIG. 4 shows a call flow 400 illustrating an example staged setup process, e.g., from computing device 102 representing a VoLTE UE, to an IMS-based telecommunications network 106, according to various implementations. Computing device 102 communicates with core network device 108, e.g., an S-CSCF, and second core network device 120, e.g., a TAS. Other components of telecommunications network 106, e.g., authorization server 122, are omitted for brevity.

Computing device 102 transmits, to core network device 108, a message 402 including a registration request 124 and a subsidiary request 126. In this example, the registration request 124 includes a SIP REGISTER request and the subsidiary request 126 includes a header in the SIP REGISTER request, specifically, the header "P-Implicit-Subscribe: dialog, reg". Core network device 108 responds with a SIP 401 Unauthorized and a challenge, as described above with reference to FIG. 3. In response, as indicated by arrow 404, computing device 102 transmits a message 406 including the registration request 124, the subsidiary request 126, and the response to the challenge.

At block 408, core network device 108 processes the registration indicated in registration request 124 of message 406. For example, core network device 108 can perform authentication or authorization processing, e.g., including message exchanges with authorization server 122. Also at block 408, e.g., in response to successful processing of the registration, core network device 108 processes the subsidiary request 126. In the illustrated example, core network device 108 processes the request to subscribe to the "reg" event package. Block 408 can include, e.g., storing, in a computer-readable memory such as computer-readable media 230, information associated with the subsidiary request 126 such as identification information of the computing device 102 and an associated indication that the "reg" event package has been subscribed to.

In some examples, at block 408, or in response to successful completion of processing at block 408 (and likewise throughout this document), core network device 108 can transmit an acknowledgement associated with both the registration request and the subsidiary request. In the illustrated example, this acknowledgement is depicted as message 410, shown dotted for clarity. In some examples, alternatively, core network device 108 can refrain from sending an acknowledgement until further processing has been performed, e.g., as described below. In the illustrated nonlimiting example, block 408 includes processing a subscription to the "reg" event package, but not to the "dialog" event package, even though both event packages are indicated in message 406. Accordingly, in the illustrated example, message 410 includes the header "P-Implicit-Subscribe: reg", which is an acknowledgement of the subscription to the "reg" package but not of a subscription to the "dialog" package.

In some examples, at block 408, core network device 108 can transmit an indication of the subsidiary request 126, e.g., via the telecommunications network 106. The indication can represent part or all of the subsidiary request 126. In the illustrated example, core network device 108 transmits message 412, including the indication of the subsidiary request 126, to second core network device 120. In some examples, core network device 108 transmits message 412 including a copy of registration request 124, or a second registration request 130, in association with the indication of the subsidiary request 126. For example, core network device 108 can fork the SIP REGISTER or other message 406 to one or more ASes or other second core network device(s) 120. The second registration request 130 can be the same as registration request 124 or can be different.

In some examples, block 408 can include determining message 412 based at least in part on iFCs (Initial Filter Criteria), e.g., retrieved from an HSS and corresponding to a particular user of computing device 102. Block 408, e.g., carried out by an S-CSCF, can search the contents of an incoming message, e.g., message 406, for strings that match patterns in the iFCs. If a match of a particular pattern is found, block 408 can include performing instructions in the iFC associated with that pattern. For example, for iFCs for the REGISTER SIP method, the iFCs can include patterns matching feature tags found in the Contact header in the SIP REGISTER message. The instructions associated with those patterns can include instructions to send third-party registration(s) (TPR(s)) to the corresponding AS(es) that handle the feature(s) indicated by the Contact-header feature tags. iFCs can also be used in determining or triggering other actions or messages described herein, e.g., with reference to blocks 506, 702, 704, 810, 812, 902, 904, 1010, or 1012.

In the illustrated example, since core network device 108 has processed the subscription to the "reg" event package, core network device 108 transmits message 412 including the indication "P-Implicit-Subscribe: dialog" to second core network device 120. In other examples, core network device 108 can transmit message 412 including the full indication "P-Implicit-Subscribe: dialog, reg" received in message 406.

At block 414, second core network device 120 receives the second registration request 130 carried in message 412 and determines the subsidiary request 126 from message 412. Second core network device 120 then processes the second registration request 130, e.g., as described above with reference to block 408. For example, second core network device 120 can store, in a computer-readable memory such as CRM 230, information associated with the subsidiary request 126. In some examples, second core network device 120 can store identification information of computing device 102 in association with information that the "dialog" event package has been subscribed to.

At block 414, second core network device 120 can transmit an acknowledgement associated with both the registration request and the subsidiary request 126, here, the "dialog" event subscription. In this example, message 416 is associated with the second registration request 130, carried in message 412, and also with that portion of the subsidiary request 126 that was included in message 412. In this example, message 416 includes a SIP 200 OK response to message 412. Message 416 also includes the "P-Implicit-Subscribe: dialog" header, indicating that the 200 OK applies to both the registration and to the subscription to the "dialog" event package indicated in message 412.

In some examples, core network device 108 can receive the acknowledgement, e.g., message 416, from second core network device 120. The acknowledgement in message 416 can be associated with the indication that was included in message 412 of the subsidiary request 126. As indicated by arrow 418, in response to the acknowledgement, core network device 108 can transmit a second acknowledgement associated with the registration request 124 via the telecommunications network 106. The second acknowledgement is depicted as part of message 420. In the illustrated example, message 420 includes a SIP 200 OK response indicating success of the SIP REGISTER request in message 406. The illustrated example message 420 also includes a "P-Implicit-Subscribe: dialog, reg" header, indicating that the subsidiary request 126 has been processed (the "reg" subscription at block 408 and the "dialog" subscription at block 414). Therefore, the 200 OK applies to both the registration and to the subsidiary request 126 included in message 406. In this and other examples, the second acknowledgement in message 420 can indicate both a status of the registration request and a status of the subsidiary request. This can reduce bandwidth used by acknowledgements, as described below.

In some examples, as indicated by arrow 422, in response to the completion of processing in block 408, core network device 108 can transmit the acknowledgement, e.g., message 420. In some examples, core network device 108 can transmit the acknowledgement, e.g., message 420, in response to both receipt of the acknowledgement in message 416 and completion of processing at block 408 (arrows 418 and 422, respectively). In some examples, core network device 108 can transmit an error message in response to at least one of failure of processing at block 408 or failure to receive the acknowledgement in message 416. In some examples, core network device 108 can transmit at most one of, or both of, message 410 or message 420.

In some examples, following a successful subscription, e.g., acknowledged by message 420, a core network device, in this example second core network device 120, can transmit notification messages, e.g., SIP NOTIFY messages. In the illustrated nonlimiting example, second core network device 120 transmits message 424, e.g., a SIP NOTIFY including the header "Event: dialog" to identify the "dialog" event package. Core network device 108 receives message 424 and forwards it as message 426 to computing device 102. Computing device 102 receives message 426 and responds with a SIP 200 OK, shown as message 428. Core network device 108 receives message 428 and forwards the SIP 200 OK to second core network device 120 as message 430.

In the illustrated nonlimiting example, message 420 further includes a "P-Implicit-Notify: reg" SIP header. This SIP header can represent a subsidiary message 432 included in message 420. A SIP NOTIFY or other subsidiary message 432 can be incorporated into message 420 or another message using any of the techniques described herein for incorporating subsidiary requests 126 into a registration request 124 or other message, e.g., as a SIP header or SIP body. Incorporating subsidiary message 432 into message 420 can reduce bandwidth usage by removing the need to send duplicate headers in a SIP 200 OK response and a separate SIP NOTIFY request. Examples of bandwidth savings are discussed below with reference to Tables 2A and 2B. In some examples, as indicated by arrow 434, computing device 102 can respond to the subsidiary message 432, e.g., with a SIP 200 OK such as message 428, or with another subsidiary-message response (omitted for brevity).

Table 1 shows examples of packet configurations for a staged setup according to various examples described herein. In Table 1, "RR" denotes registration request 124 and "SR" denotes subsidiary request 126. "Ackn." denotes an acknowledgement, e.g., a SIP response or a SIP PRACK or ACK request and its response.

TABLE 1

| Example | SR Represented As | Bandwidth Savings |
| --- | --- | --- |
| 1 | Header in RR | All duplicate headers can be removed; one Ackn. covers SR and RR. |
| 2 | Encoded body in RR (e.g., XML) | SIP start-line and some headers can be removed; one Ackn. covers SR and RR. |
| 3 | Full message included as body of RR | One Ackn. covers SR and RR. |

Tables 2A and 2B show an example of a SIP REGISTER request, e.g., the "SIP REGISTER+Response" message in FIG. 3, and a SIP SUBSCRIBE request, e.g., the "SIP SUBSCRIBE+Event: reg" message in FIG. 3. Tables 2A and 2B are divided for presentation but represent only one SIP REGISTER request and only one SIP SUBSCRIBE request. The requests shown in Tables 2A and 2B are requests that were captured, except (1) that they have been anonymized; (2) whitespace has been added for readability; and (3) the Feature-Caps header has been removed from the REGISTER request. As noted in the "Match" column, many of the headers duplicate ("whole") or overlap ("part") each other. In Tables 2A and 2B, for overlapping ("part") rows, the differences between the requests are shown in uppercase. Non-uppercase portions are duplicate information, so can be compressed or omitted. Moreover, rows noted in the "Match" column as "imp" (for "implicit") would have matched if implicit registration had been used, e.g., if message 406, FIG. 4, had been used instead of the separate REGISTER and SUBSCRIBE requests shown in FIG. 3. Rows noted as "part; imp" match in part, and would have matched in full if a message such as message 406 had been used.

When using Examples 1 or 2 in Table 1, for example, the duplicate information is only expressed once in the registration request 124, rather than twice in separate REGISTER and SUBSCRIBE requests (e.g., as shown in FIG. 3). As shown in Tables 2A and 2B, the duplicate or overlapping header values total over 350 bytes, not including the rows marked as "imp" in the "Match" column. Therefore, using Table 1, Examples 1 or 2, to represent the subsidiary request 126 as a delta from the registration request 124 instead of as a freestanding request can save over 350 bytes per SUBSCRIBE. As shown in FIG. 3, a UE 302 may issue multiple SUBSCRIBE requests, each carrying the overhead. Therefore, the call flow 400 shown in FIG. 4, in the example shown in Tables 2A and 2B, can save over 700 bytes of data transfer, plus the bytes saved from "imp" rows, each time computing device 102 or 104 registers to network 106 or otherwise conducts a staged setup. This savings of data transfer can reduce the time and energy required to conduct the staged setup, which can increase performance of network 106 for multiple users, and can increase battery life of a portable computing device 102.

In some configurations, e.g., using Examples 1 or 2 from Table 1, any header or value that is not present in subsidiary request 126 and that is required for processing of subsidiary request 126 is assumed to have the same value as a corresponding header or value in registration request 124.

TABLE 2A

| SIP REGISTER request | Match? | SIP SUBSCRIBE request |
| --- | --- | --- |
| REGISTER sip:msg.pc.example.com SIP/2.0 | imp | SUBSCRIBE sip:14255554242@msg.pc.example.com SIP/2.0 |
| Max-Forwards: 69 | whole | Max-Forwards: 69 |
| Via: SIP/2.0/UDP 10.3.13.37:5060;branch=B1 | part; imp | Via: SIP/2.0/UDP 10.3.13.37:5060;branch=B2 |
| To: <sip:14255554242@msg.pc.example.com> | whole | To: <sip:14255554242@msg.pc.example.com> |
| From: <sip:14255554242@msg.pc.example.com>;tag=T1 | part; imp | From: <sip:14255554242@msg.pc.example.com>;tag=T2 |
| Call-ID: cid1 | imp | Call-ID: cid2 |
| CSeq: 32 REGISTER | imp | CSeq: 1 SUBSCRIBE |
| Contact: <sip:123456789@10.3.13.37:5060;transport=udp>;expires=3600;+g.3gpp.icsi-ref="urn%3Aurn-7%3A3gpp-service.ims.icsi.mmtel";+g.3gpp.mid-call;+g.3gpp.smsip;+g.3gpp.srvcc-alerting;+sip.instance="<urn:gsma:imei:imei1>" Authorization: Digest username="310260123456789@msg.pc.example.com", realm="msg.pc.example.com",nonce="nonce1", uri="sip: msg.pc.example.com",response="7e5d 09ce",algorithm=AKAv1-MD5,integrity-protected=yes | imp | Contact: <sip:bytes1.as01.sip.example.com;tokenized-by=s1.as01.sip.example.com;ivec=ivec 1;EriBindingId=123456789;eribind-generated-at=10.3.13.37>;+sip.instance="<urn:gsma :imei:12345678-9abcde-f>" |

TABLE 2A-continued

| SIP REGISTER request | Match? | SIP SUBSCRIBE request |
|---|---|---|
| | | Route: <sip:userpart1@nsh6.scf.sip.example.com:5060;lr> Record-Route: <sip:10.3.13.37;transport=udp;lr> Event: reg Expires: 600000 |

TABLE 2B

| SIP REGISTER request (cont.) | Match? | SIP SUBSCRIBE request (cont.) |
|---|---|---|
| P-Access-Network-Info: 3GPP-E-UTRAN-FDD;utran-cell-id-3gpp=310260123456789ab | whole | P-Access-Network-Info: 3GPP-E-UTRAN-FDD;utran-cell-id-3gpp=310260123456789ab P-Asserted-Identity: <sip:14255554242@msg.pc.example.com> |
| P-Charging-Vector: icid-value=s1.as01.sip.example.com-1234-56789a-ABCDEF;icid-generated-at=s1.as01.sip.example.com | part; imp | P-Charging-Vector: icid-value=s1.as01.sip.example.com-1234-56789a-FEDCBA;icid-generated-at=s1.as01.sip.example.com |
| P-Visited-Network-ID: as01.sip.example.com | whole | P-Visited-Network-ID: as01.sip.example.com |
| Path: <sip:123456789@s1.as01.sip.example.com;transport=udp;lr>;+g.3gpp.atcf="<tel:+19125551234>";+g.3gpp.atcf-mgmt-uri="<sip:123456789@s1.as01.sip.example.com>" | imp | |
| Supported:100rel | whole | Supported: 100rel |
| Supported: path | whole | Supported: path |
| Supported: replaces | whole | Supported: replaces |
| User-Agent: genericOS/42.0 genericPhone | whole | User-Agent: genericOS/42.0 genericPhone |
| Content-Length: 0 | whole | Content-Length: 0 Session-ID: sessid1 |
| Allow: ACK, BYE, CANCEL, INVITE, MESSAGE, NOTIFY, OPTIONS, PRACK, REFER, UPDATE | whole | Allow: ACK, BYE, CANCEL, INVITE, MESSAGE, NOTIFY, OPTIONS, PRACK, REFER, UPDATE Accept: application/reginfo+xml |

Figure 5:
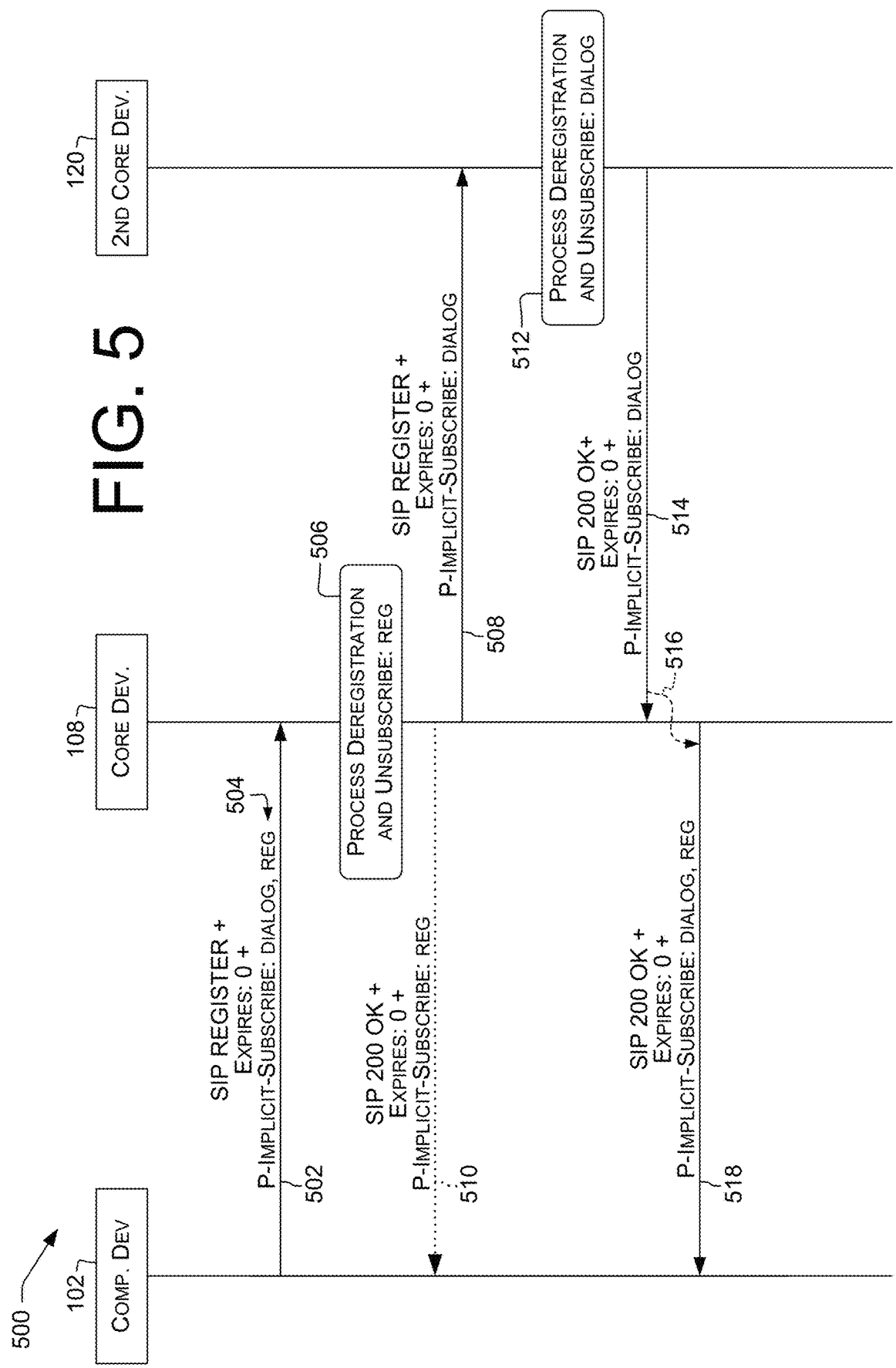
FIG. 5 shows a call flow illustrating an example deregistration process according to some implementations.

FIG. 5 shows a call flow 500 illustrating an example deregistration process, e.g., from computing device 102 representing a VoLTE UE, to an IMS-based telecommunications network 106, according to some implementations. Components are as in FIG. 4 except as indicated. Call flow 500 can take place, e.g., after transmission of message 420.

In the illustrated example, computing device 102 transmits a deregistration request 502, e.g., via network 106. The illustrated deregistration request 502 includes a SIP REGISTER request including an "Expires: 0" header. This header indicates the registration should be removed. Deregistration request 502 also includes a subsidiary termination request 504, in this example a "P-Implicit-Subscribe: dialog, reg" header in association with the "Expires: 0" header.

At block 506, core network device 108 determines that deregistration request 502 includes subsidiary termination request 504. In response, core network device 108 transmits an indication (here, message 508) of the subsidiary termination request 504 via network 106, e.g., to second core network device 120. At block 506, core network device 108 can additionally or alternatively process at least one of the subsidiary termination request 504 or the deregistration request 502. Block 506 can include transmitting an acknowledgement message 510, e.g., as discussed below with reference to message 514. Acknowledgement message 510 can be associated with (e.g., indicate success of) both deregistration request 502 and subsidiary termination request 504, e.g., to the extent that the deregistration request 502 and the subsidiary termination request 504 are processed in block 506. In the illustrated example, message 510 is not associated with the "dialog" unsubscription, since that is not processed in block 506 or otherwise before transmission of message 510. Accordingly, the illustrated message 510 includes the SIP headers "Expires: 0" and "P-Implicit-Subscribe: reg", but not "P-Implicit-Subscribe: dialog". This example is not limiting. In the above example deregistration request 502, the request to terminate subscriptions (subsidiary termination request 504) is indicated by the "P-Implicit-Subscribe" header in association with the "Expires" header indicating that termination is desired. In some examples, additionally or alternatively, the subsidiary termination request 504 can include additional information, or can be independent of other headers or portions of messages. For example, the subsidiary termination request 504 can include a SIP header such as "P-Implicit-Subscribe: dialog; expires=0, reg; expires=31415". This example SIP header is a subsidiary termination request 504 with respect to the "dialog" event package, due to the "expires=0". This example SIP header is not a subsidiary termination request 504 with respect to the "reg" event package, due to the "expires=31415" setting an expiration time approximately 8.7 hours from receipt. In some examples, this example SIP header is both a subsidiary termination request 504 to unsubscribe from the "dialog" event package and a subsidiary request 126 to subscribe to the "reg" event package. In some examples, registration request 124 and subsidiary request 126 (or any component thereof) can have respective, different values for a particular parameter, e.g., "expires" values.

Deregistration request 502 is an example of a session-modification request. In some examples, a session-modification request requests a change to an attribute of a session, e.g., to register, deregister, subscribe, or unsubscribe. In some examples, a SIP message including the above example SIP header is a session-modification request, at least because that SIP message includes a subsidiary termination request 504. In some examples, accordingly, block 506 includes determining that a session-modification request (e.g., the deregistration request 502 or other types of session-modification requests described herein) includes the subsidiary termination request 504. Similarly, in some examples, block 506 can include transmitting message 508 including a session-modification request.

In some examples, a session-modification request can include a message terminating a registration, e.g., a SIP REGISTER request including an "Expires: 0" header (e.g., deregistration request 502). In some examples, a session-modification request can include a subsidiary termination request 504, even if the session-modification request is not a deregistration request 502. An example session-modification request is a SIP REGISTER request with a positive value indicated in the "Expires" header, e.g., to renew the registration, and including a subsidiary termination request 504 such as "P-Implicit-Subscribe: dialog; expires=0". A core network device 108 or second core network device 120 receiving this example session-modification request can, e.g., at block 506 or block 512, renew the registration and terminate the subscription to the "dialog" event package.

At block 512, in response to the session-modification request in message 508, e.g., a forked copy or forward of deregistration request 502, and likewise throughout the discussion of block 512, the second core network device 120 determines that the session-modification request (e.g., the deregistration request 502) includes the subsidiary termination request 504 (or a portion thereof), in this example the "Expires: 0" header in association with the "P-Implicit-Subscribe: dialog" header or in other examples, e.g., a "P-Implicit-Subscribe: foo; expires=0" header for some event package "foo". The second core network device 120 can process the subsidiary termination request 504 and the session-modification request (e.g., the deregistration request 502), e.g., in that order. For example, the second core network device 120 can alter (e.g., modify or delete) information stored in a computer-readable memory such as CRM 230 based at least in part on at least one of the session-modification request (e.g., the deregistration request 502) or the subsidiary termination request 504, or, for the avoidance of doubt, based at least in part on both the session-modification request (e.g., the deregistration request 502) and the subsidiary termination request 504. For example, the second core network device 120 can unbind SIP registrations or revert from expired soft state information to hard state information. In some examples, the session-modification request can include any combination of registrations, subscriptions, or unsubscriptions, and block 512 can include processing those items.

The second core network device 120 can further transmit, at block 512, an acknowledgement associated with both deregistration request 502 and subsidiary termination request 504. The acknowledgement is shown in message 514. In this example, message 514 includes a SIP 200 OK and headers "Expires: 0" and "P-Implicit-Subscribe: dialog". Consequently, message 514 acknowledges both (1) the deregistration; and (2) the unsubscription for the "dialog" package.

In response to message 514, as indicated by arrow 516, core network device 108 can transmit an acknowledgement, illustrated as message 518, indicating both a status of the deregistration request 502 and a status of the subsidiary termination request 504. In the illustrated example, message 518 includes a SIP 200 OK and headers "Expires: 0" and "P-Implicit-Subscribe: dialog, reg". Consequently, message 514 acknowledges both (1) the deregistration; and (2) the unsubscription for the "dialog" and "reg" packages. In some examples, core network device 108 can transmit exactly one of, or one or more of, messages 510 and 518.

Illustrative Processes

Figure 6:
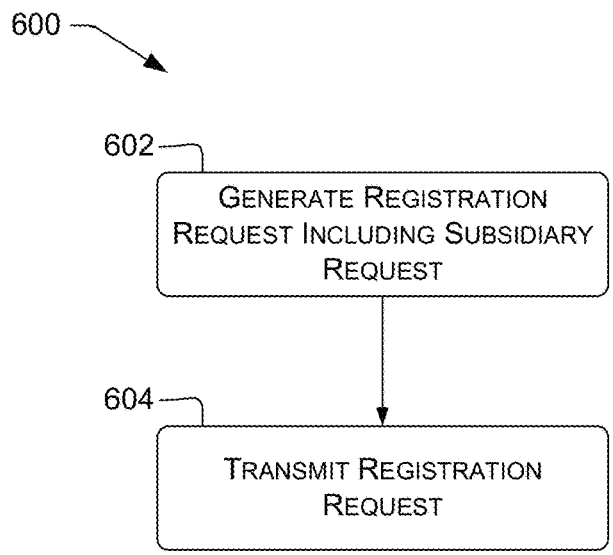
FIG. 6 illustrates an example process for registering with a telecommunications network according to some implementations.

FIG. 6 illustrates an example process 600 for registering with a network 106. Process 600 can be performed, e.g., by user equipment or other computing devices 102 (or 104, and likewise throughout the following discussion). Computing device 102 can include a communications interface such as radio 222, as discussed above. In some examples, the computing device 102 includes one or more processors 212 configured to perform operations described below, e.g., in response to computer program instructions of the client application 226. Operations shown in FIGS. 6-10 can be performed in any order except when otherwise specified, or when data from an earlier step is used in a later step. Any operation shown in multiple figures can be as discussed with reference to the first figure in which that operation is shown.

For clarity of explanation, reference is herein made to various components shown in FIGS. 1 and 2, and messages shown in FIGS. 4 and 5, that can carry out or participate in the steps of the exemplary method. It should be noted, however, that other components can be used; that is, exemplary method(s) shown in FIGS. 6-10 are not limited to being carried out by the identified components.

At 602, computing device 102 generates a registration request 124. The registration request 124 includes a subsidiary request 126 related to the user equipment (or other computing device 102). For example, block 602 can include generating the registration request 124 including a Session Initiation Protocol (SIP) REGISTER request and generating the subsidiary request 126 including at least one of a SIP header or a SIP message body in the registration request. Examples are discussed above with reference to, e.g., messages 402 or 406, FIG. 4. In some examples, registration request 124 can include authorization information associated with the user equipment, e.g., as discussed above with reference to FIG. 2. In some examples, computing device 102 can determine registration request 124 based at least in part on service information 224, e.g., an IMEI or IMSI.

Subsidiary request 126 can be represented, e.g., as a SIP message body of the registration request 124, unencoded and flagged with MIME (Multipurpose Internet Mail Extensions) Content-Type "message/sip", or encoded in XML or other formats and marked with appropriate Content-Types. XML or other encodings need not preserve the syntax of SIP, but can instead represent the same data in another form. For example, the SIP request start-line "SUBSCRIBE sip:42@example.com SIP/2.0" can be represented in XML as '<request method="sub" uri="sip:42@example.com" ver="2.0">'.

In some examples, subsidiary request 126 can differ from registration request 124 in at least one of: method, request URI, SIP (or other protocol) version, at least one header, message-body MIME content type, or message-body contents. In some examples, subsidiary request 126 can differ from registration request 124 in at least the presence or contents of a SIP header other than Request-URI, Via, Record-Route, Route, Max-Forwards, and Proxy-Authorization. In some examples, subsidiary request 126 is not a copy of registration request 124. In some examples, subsidiary request 126 can differ from registration request 124 in at least the presence or contents of at least one of the following SIP headers: To, From, Call-ID, CSeq, or Contact. In some examples, subsidiary request 126 can differ from registration request 124 in at least the presence or contents of at least one of the following SIP headers: Subject, Reply-To, Organization, Accept, Accept-Encoding, Accept-Language, Alert-Info, Error-Info, Authentication-Info, Expires, In-Reply-To, Require, Supported, Unsupported, Retry-After, User-Agent, Server, and Warning. In some examples, subsidiary request 126 can differ from registration request 124 in at least the presence or contents of the Date SIP header. In some examples, subsidiary request 126 can include, or differ from registration request 124 in at least the presence or contents of, at least the following headers: Min-Expires, Timestamp, Authorization, Priority, and WWW-Authenticate. In some examples, subsidiary request 126 can include, or differ from registration request 124 in at least the presence or contents of, at least any subset of any of the lists of headers given in this paragraph, or combinations of those lists. For example, subsidiary request 126 can include, or differ from registration request 124 in at least the presence or contents of, at least one of the following SIP headers: Request-URI, To, Reply-To, Date, and Min-Expires. In any of the examples listed in or contemplated by this paragraph, subsidiary request 126 can include, e.g., a full SIP message provided as the message body of registration request 124. Registration request 124 can, in some examples, include a header indicating that the message body is or includes a subsidiary request 126, e.g., "P-Subsidiary-Body: true".

In some examples, the subsidiary request 126 corresponds to at least one of a SIP SUBSCRIBE request or a SIP PUBLISH request. In some examples, the subsidiary request 126 can include a SIP SUBSCRIBE request or a SIP PUBLISH request. In some examples, the subsidiary request 126 can include an indication of a SIP SUBSCRIBE request or a SIP PUBLISH request. Subsidiary request 126 can be represented, e.g., as a SIP header such as "P-Implicit-Subscribe", or in general as "P-Implicit-<method>", with "<method>" replaced by the name of a SIP method. For example, a SIP SUBSCRIBE can carry a "P-Implicit-Publish" header. In some examples not including the entirety of, e.g., a SIP message in the registration request 124, common fields can be implied, e.g., as discussed herein with reference to Tables 1, 2A, and 2B. The subsidiary request 126 can additionally or alternatively include a SIP NOTIFY request, e.g., as discussed above with reference to message 420.

In some examples, the subsidiary request 126 can correspond to a plurality of SIP requests associated with respective, different SIP event packages. For example, the subsidiary request 126 can correspond to a SUBSCRIBE to the "dialog" package, a SUBSCRIBE to the "reg" package, and a PUBLISH to the "presence" package. The plurality can include zero or more SUBSCRIBE requests, zero or more PUBLISH requests, or zero or more other requests relating to SIP event packages.

At 604, computing device 102 transmits the registration request 124 via the communications interface. For example, computing device 102 can transmit message 402 or 406, FIG. 4. The registration request 124 can be transmitted, e.g., via a wired or wireless network 206, e.g., a VoLTE network carrying IP datagrams.

Figure 7:
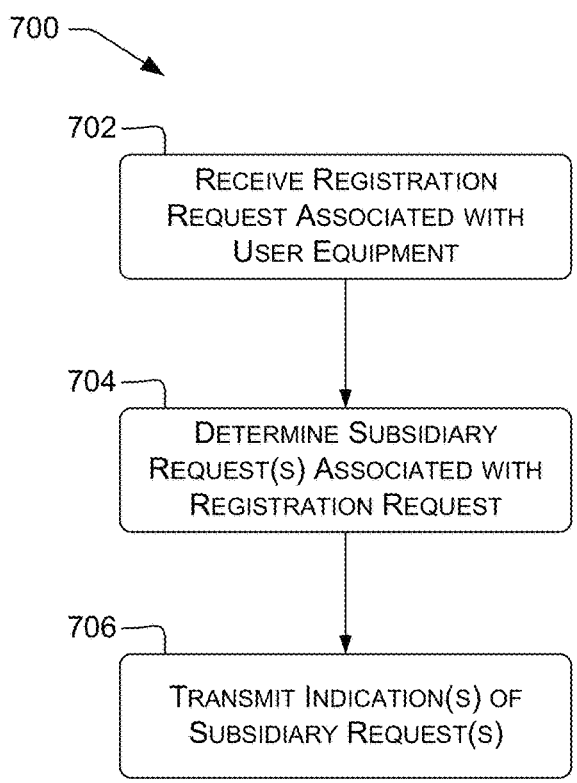
FIG. 7 illustrates an example process for processing a registration request according to some implementations.

FIG. 7 illustrates an example process 700 for processing a registration request. Process 700 can be performed, e.g., by a core network device, e.g., core network device 108, FIG. 1 or server 204, FIG. 2, of a telecommunications network 106. Core network device 108 can include, e.g., an S-CSCF. Process 700 can be performed by a network device communicatively connectable with UE, e.g., computing device 102, FIG. 1, or computing device 202, FIG. 2, of a telecommunications network 206. Examples of blocks 702-706 are discussed above with reference to block 408.

At 702, core network device 108 can receive a registration request 124 associated with a user equipment (UE). For example, core network device 108 can receive registration request 124 from computing device 102. Registration request 124 can include a subsidiary request 126, e.g., as discussed above with reference to block 602.

At 704, core network device 108 can determine a subsidiary request 126, or one or more subsidiary requests 126, of the UE. The subsidiary request(s) 126 can be determined, e.g., based on content of the registration request 124. For example, core network device 108 can parse registration request 124 to find headers or message bodies of the subsidiary request(s) 126. Additionally or alternatively, core network device 108 can receive additional transmission(s) via network 106 and determine, e.g., by comparing header fields between the registration request 124 and the additional transmission(s), that the additional transmission(s) are associated with the registration request 124 and correspond to the subsidiary request(s) 126. Examples of subsidiary requests 126 associated with registration requests 124 are discussed above, e.g., with reference to messages 402 and 406, FIG. 4, and block 602, FIG. 6. Block 704 can also include processing at least part of at least one of the subsidiary request(s) 126.

At 706, core network device 108 can transmit indication(s) of the subsidiary request(s) 126, e.g., on behalf of the UE, via the telecommunications network. The indication(s) can be transmitted, e.g., to at least one second core network device 120, e.g., an AS, of the telecommunications network 106. The indication can be transmitted, e.g., as discussed above with reference to message 412. For example, core network device 108 can fork a SIP REGISTER message to multiple second core network devices 120, including in each forked REGISTER only event packages or other information relevant to the specific second core network device 120 receiving that particular forked REGISTER. In some examples, block 706 can include removing or excluding, from the forked requests 130, subsidiary request(s) 126 handled or to be handled by core network device 108.

In some examples, individual one(s) of the subsidiary request(s), or each of the subsidiary request(s), can correspond to at least one of a SIP SUBSCRIBE request or a SIP PUBLISH request. Examples are discussed above, e.g., with reference to block 602.

Figure 8:
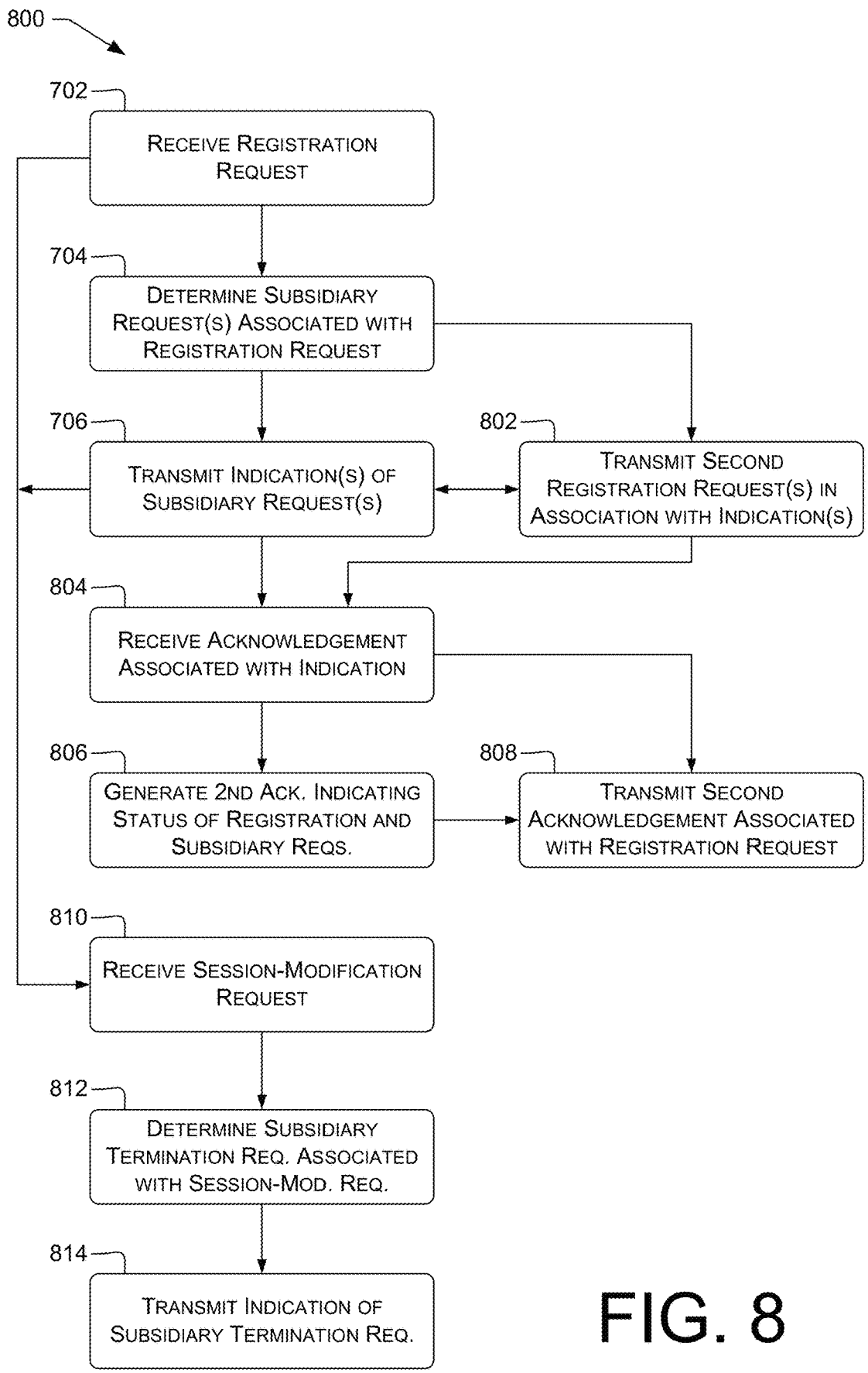
FIG. 8 illustrates an example process for processing a registration or deregistration request according to some implementations.

FIG. 8 illustrates an example process 800 for processing a registration or deregistration request. Process 800 can be performed, e.g., by a core network device, e.g., core network device 108 or other devices described above. In some examples, block 702 can be followed by block 810, or block 706 can be followed by block 802, block 804, or block 810.

At 802, core network device 108 can transmit a second registration request 130, e.g., on behalf of the UE, in association with the indication of the subsidiary request 126 via the telecommunications network 106. Examples are discussed above, e.g., with reference to block 408 and message 412, FIG. 4. In some examples, the second registration request 130 can include a SIP REGISTER request and the indication of the subsidiary request 126 can include at least one of a SIP header or a SIP message body in the second registration request 130, e.g., a P-Implicit-Subscribe header or other header or body such as those as discussed above.

At 804, e.g., after block 706, core network device 108 can receive an acknowledgement associated with the indication of the subsidiary request 126 via the telecommunications network 106. Examples are discussed above, e.g., with reference to message 416 and arrow 418. Block 804 can be followed by block 806 or block 808.

At 806, core network device 108 can generate a second acknowledgement indicating both a status of the registration request and a status of the subsidiary request. Examples of the second acknowledgement are discussed above, e.g., with reference to message 420. In some examples, the second acknowledgement can include a single status field, e.g., a SIP result code, indicating either that (a) the registration request 124 and the subsidiary request 126 both succeeded; or (b) at least one of the registration request 124 and the subsidiary request 126 failed. In other examples, the second acknowledgement can include respective status codes for the registration request 124 and the subsidiary request 126. Examples are discussed above, e.g., with reference to arrow 418 and message 420.

At 808, e.g., in response to the acknowledgement received at block 804, core network device 108 can transmit a second acknowledgement associated with the registration request 124 via the telecommunications network 106. Examples are discussed above, e.g., with reference to message 420. In some examples, the second acknowledgement can be transmitted toward the UE. For example, the second acknowledgement can be transmitted to the UE via a respective access network such as access network 110, or can be transmitted directly to the UE.

At 810, core network device 108 can receive a session-modification request associated with the UE via the telecommunications network 106. The session-modification request can include, e.g., a deregistration request 502, as discussed above, e.g., with reference to message 502, FIG. 5. The session-modification request can additionally or alternatively include other types of messages, e.g., as discussed above with reference to blocks 506 or 512. Some examples of blocks 810-814 are discussed above with reference to block 506.

At 812, core network device 108 can determine that the session-modification request (e.g., the deregistration request 502) includes a subsidiary termination request 504. Examples are discussed above, e.g., with reference to FIG. 5 or block 704. Block 812 can also include processing at least part of the subsidiary termination request 504.

At 814, core network device 108 can transmit an indication of the subsidiary termination request via the telecommunications network 106. The indication can be included in another message, e.g., message 508, FIG. 5. For example, core network device 108 can fork the session-modification request (e.g., the deregistration request 502) to one or more ASes.

Figure 9:
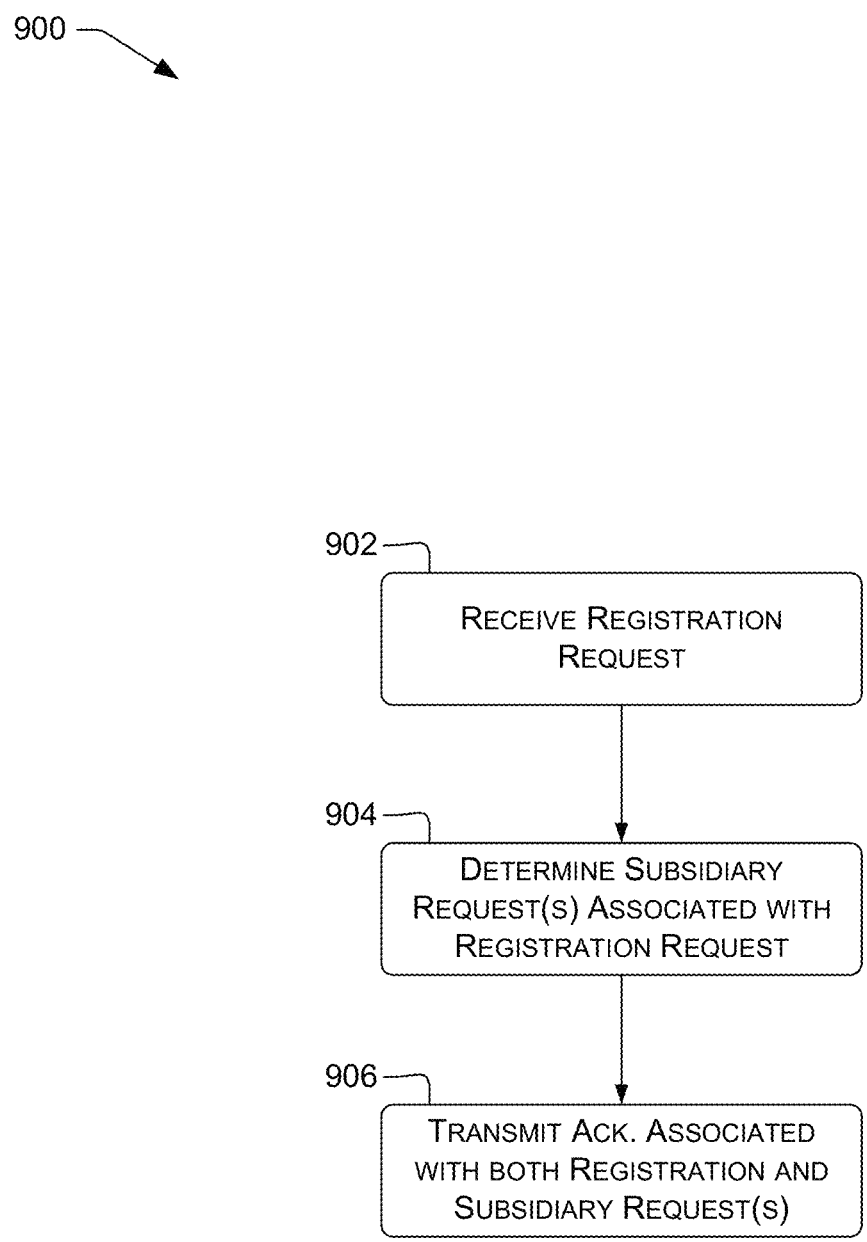
FIG. 9 illustrates an example process for processing a registration request according to some implementations.
Figure 10:
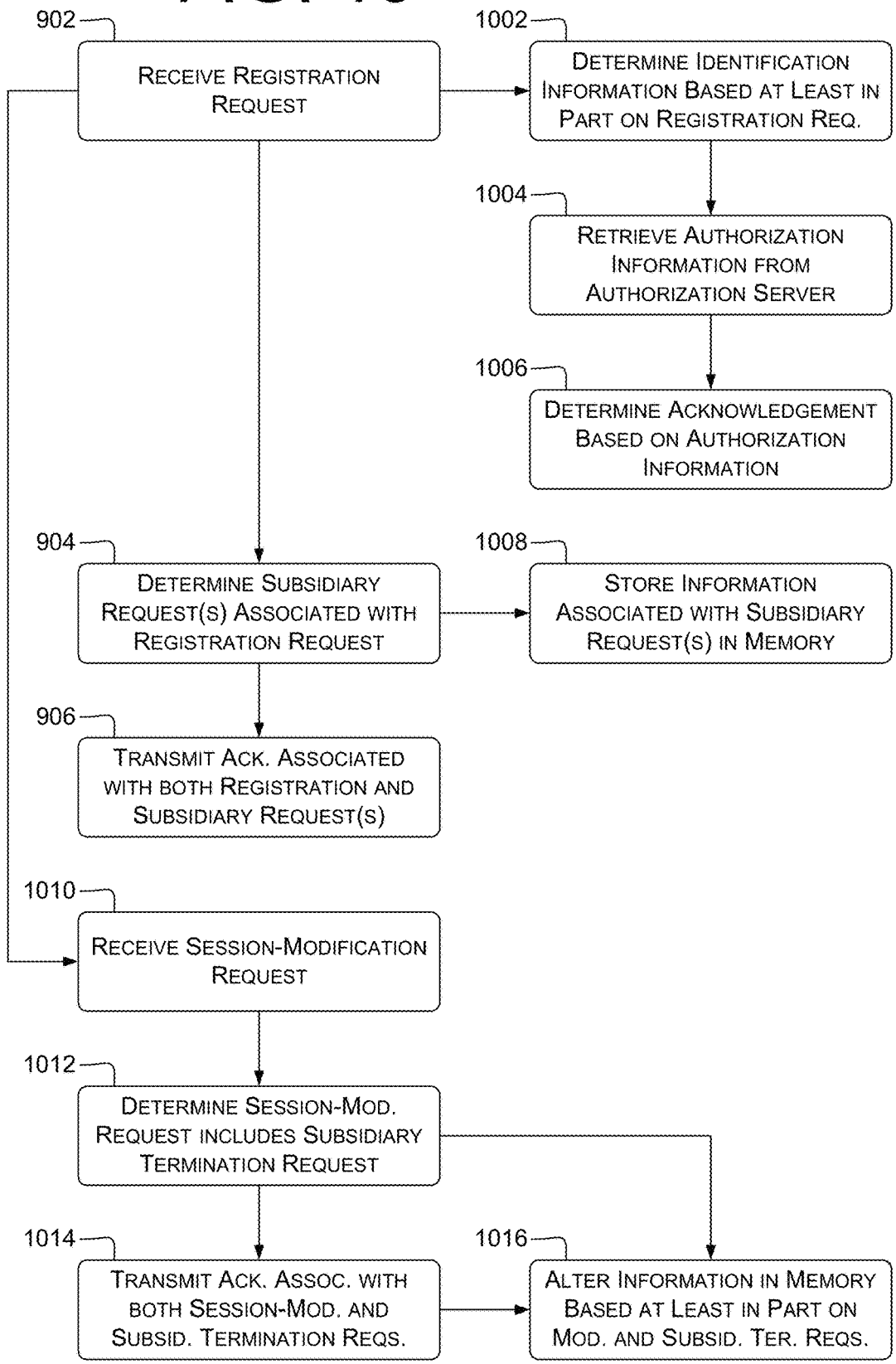
FIG. 10 illustrates an example process for processing a registration or deregistration request according to some implementations.

FIG. 9 illustrates an example process 900 for processing a registration request. Process 800 can be performed, e.g., by a core network device such as second core network device 120, FIG. 1, or server 204, FIG. 2, e.g., an application server such as a TAS. In some examples such as an example illustrated in FIG. 4, blocks 902-906 are performed by core network device 108 with respect to the "reg" subscription in message 406, and by second core network device 120 with respect to the "dialog" subscription in messages 406 and 412. The discussion of FIGS. 9 and 10 is in terms of second core network device 120 for brevity, without limitation.

At 902, second core network device 120 can receive a registration request, e.g., associated with a user equipment (UE). In some examples, the registration request can include a registration request 124 from a UE or a second registration request 130 from a core network device 108. Examples are discussed above, e.g., with reference to messages 406 or 412, or blocks 408 or 702.

At 904, second core network device 120 can determine a subsidiary request 126 of the UE, based on content of the registration request 124 or second registration request 130. Examples are discussed above, e.g., with reference to FIG. 4 or blocks 408, 414, or 704. Block 904 can also include processing at least part of the subsidiary request 126, e.g., as discussed above with reference to block 414. Block 904 can include determining multiple subsidiary request(s) 126, e.g., relevant to respective SIP event packages.

In some examples, the subsidiary request 126 corresponds to at least one of a SIP SUBSCRIBE request or a SIP PUBLISH request. The subsidiary request 126 can additionally or alternatively correspond to any of the request types of forms described above, e.g., with reference to block 602 (e.g., other SIP methods).

At 906, second core network device 120 can transmit, e.g., toward the UE, an acknowledgement associated with both the registration request and the subsidiary request. Examples are discussed above, e.g., with reference to messages 416 or 420 or blocks 414 or 806. For example, second core network device 120 can provide the acknowledgement in response to a forked SIP REGISTER from core network device 108, and the acknowledgement can include a Request-URI or SIP header designating the UE.

FIG. 10 illustrates an example process 1000 for processing a registration or deregistration request. Process 800 can be performed, e.g., by a core network device such as second core network device 120, FIG. 1, or other devices described above.

At 1002, e.g., after block 902, the second core network device 120 can determine identification information associated with the UE based at least in part on the registration request. For example, the second core network device 120 can retrieve a SIP Request-URI or Contact header value.

At 1004, the second core network device 120 can retrieve, from an authorization server 122, authorization information corresponding to the identification information. The authorization information can include, e.g., access rights, access control lists, initial filter criteria, keys, tickets, Subscriber Identity Module (SIM) card information, or other data useful for controlling access to network 106 resources.

At 1006, the second core network device 120 can generate the acknowledgement, e.g., message 416 or 420, based at least in part on the authorization information. In some examples, the second core network device 120 can determine responses, e.g., the acknowledgement, to one or more requests, e.g., at least one of registration request 124, subsidiary request 126, or second registration request 130, based at least in part on the authorization information. For example, the second core network device 120 can accept a registration from, and generate an acknowledgement to, only a UE indicated by the authorization information as corresponding to an authorized UE or user.

At 1008, e.g., after block 904, the second core network device 120 can store, e.g., in a computer-readable memory, information associated with the subsidiary request(s) 126. Examples are discussed above, e.g., with reference to CRM 230.

At 1010, e.g., after block 902, the second core network device 120 can receive a session-modification request (e.g., a deregistration request 502) associated with the UE. Examples are discussed above, e.g., with reference to deregistration request 502 and message 508, and block 810.

At 1012, the second core network device 120 can determine that the session-modification request (e.g., the deregistration request 502) includes a subsidiary termination request 504. Block 1012 can also include processing at least a portion of the subsidiary termination request 504. Examples are discussed above, e.g., with reference to blocks 506, 512, 704, or 812. Block 1012 can be followed by block 1014 or block 1016.

At 1014, the second core network device 120 can transmit, e.g., toward the UE, an acknowledgement associated with both the session-modification request (e.g., deregistration request 502) and the subsidiary termination request 504. Examples are discussed above, e.g., with reference to block 512, message 514, arrow 516, and message 518.

At 1016, the second core network device 120 can alter information stored in a computer-readable memory based at least in part on the session-modification request (e.g., deregistration request 502) and the subsidiary termination request 504. Examples of storage are discussed above with reference to block 1008. Examples of alteration are discussed above with reference to block 512.

CONCLUSION

Example data transmissions (parallelograms) in FIGS. 1 and 2, example data exchanges in the call flow diagrams of FIGS. 3-5, and example blocks in the process diagram of FIGS. 6-10, represent one or more operations that can be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly set forth herein, the order in which the operations or transmissions are described is not intended to be construed as a limitation, and any number of the described operations or transmissions can be executed or performed in any order, combined in any order, subdivided into multiple sub-operations or transmissions, and/or executed or transmitted in parallel to implement the described processes.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Some examples herein are described in the context of a VoLTE network with SIP signaling for clarity of explanation. However, other networks and signaling systems employing operations described herein are encompassed within this disclosure. For example, techniques herein can be used with publish/subscribe protocols such as ZEROMQ running over IP networks. Similarly, this disclosure refers to similar operations being performed by protocols evolved from IP, SIP, and VoLTE. Moreover, techniques described herein can be used in staged setup protocols or processes in which the first request is not a registration request. For example, techniques herein can be used in a staged setup process in which the registration request is replaced by a capability-query request, e.g., to determine which protocol versions or encryption techniques a network peer supports.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Conditional language such as, among others, "can," "could," "might" and/or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" and the phrase "and/or" are used herein in an inclusive sense unless specifically stated otherwise. Accordingly, conjunctive language such as the phrases "X, Y, or Z," "X, Y, and/or Z," and/or "at least one of X, Y or Z," unless specifically stated otherwise, is to be understood as signifying that an item, term, etc., can be either X, Y, or Z, or a combination thereof.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. Moreover, in the claims, any reference to a group of items provided by a preceding claim clause is a reference to at least some of the items in the group of items, unless specifically stated otherwise.

What is claimed is:

1. A core network device of a telecommunications network, comprising:
   one or more processors; and
   a memory storing instructions, that when executable, cause the one or more processors to:
   receive a registration request associated with a user equipment (UE);
   determine that content of the registration request comprises a subsidiary request and an indication of a request type of the subsidiary request; and
   at least partially in response to determining that the content of the registration request comprises the subsidiary request, transmit an indication of the subsidiary request having the request type on behalf of the UE via the telecommunications network.

2. The core network device of claim 1, wherein the subsidiary request corresponds to at least one of a Session Initiation Protocol (SIP) SUBSCRIBE request or a SIP PUBLISH request.

3. The core network device of claim 1, wherein the instructions further cause the one or more processors to:
transmit a second registration request on behalf of the UE in association with the indication of the subsidiary request via the telecommunications network.

4. The core network device of claim 3, wherein the second registration request comprises a Session Initiation Protocol (SIP) REGISTER request and the indication of the subsidiary request comprises at least one of a SIP header or a SIP message body in the second registration request.

5. The core network device of claim 1, wherein the core network device comprises a serving call session control function (S CSCF).

6. The core network device of claim 1, wherein transmitting the indication of the subsidiary request comprises transmitting the indication of the subsidiary request to a second core network device of the telecommunications network.

7. The core network device of claim 1, wherein the instructions further cause the one or more processors to:
receive a first acknowledgement associated with the indication of the subsidiary request via the telecommunications network; and
at least partially in response to the acknowledgement, transmit a second acknowledgement associated with the registration request via the telecommunications network to the UE.

8. The core network device of claim 7, wherein the instructions further cause the one or more processors to:
generate the second acknowledgement indicating both a status of the registration request and a status of the subsidiary request.

9. The core network device of claim 1, wherein the instructions further cause the one or more processors to:
receive a session-modification request associated with the UE via the telecommunications network;
determine that the session-modification request includes a subsidiary termination request; and
transmit an indication of the subsidiary termination request via the telecommunications network.

10. The core network device of claim 1, wherein:
the registration request comprises a first Session Initiation Protocol (SIP)-method name; and
the instructions further cause the one or more processors to determine the indication of the request type comprising a second SIP-method name different from the first SIP-method name.

11. A core network device, comprising
one or more processors; and
a memory storing instructions, that when executed, cause the one or more processors to:
receive a registration request associated with a user equipment (UE);
determine that content of the registration request includes a subsidiary request associated with the UE and an indication of a request type of the subsidiary request;
transmit an indication of the subsidiary request having the request type on behalf of the UE;
receive a first acknowledgement associated with the indication of the subsidiary request; and
based at least in part on the first acknowledgment, transmit to the UE a second acknowledgement associated with both the registration request and the subsidiary request.

12. The core network device of claim 11, wherein the subsidiary request corresponds to at least one of a Session Initiation Protocol (SIP) SUBSCRIBE request or a SIP PUBLISH request.

13. The core network device of claim 11, wherein the instructions further cause the one or more processors to:
store, in the memory, information associated with the subsidiary request.

14. The core network device of claim 11, wherein the instructions further cause the one or more processors to:
determine identification information associated with the UE based at least in part on the registration request;
retrieve, from an authorization server, authorization information corresponding to the identification information; and
generate the second acknowledgement based at least in part on the authorization information.

15. The core network device of claim 11, wherein the core network device comprises an application server (AS).

16. The core network device of claim 11, wherein the instructions further cause the one or more processors to:
receive a session-modification request associated with the UE;
determine that the session-modification request includes a subsidiary termination request; and
at least partially in response to determining that the session-modification request includes the subsidiary termination request, transmit to the UE an acknowledgement associated with both the session-modification request and the subsidiary termination request.

17. The core network device of claim 11, wherein:
the registration request comprises a first Session Initiation Protocol (SIP)-method name; and
the instructions further cause the one or more processors to determine the indication of the request type comprising a second SIP-method name different from the first SIP-method name.

18. The core network device of claim 11, wherein a header of the registration request represents the subsidiary request.

19. The core network device of claim 11, wherein at least part of a body of the registration request represents the subsidiary request.

20. One or more non-transitory computer-readable media storing computer-executable instructions that, when executed by one or more processors, cause the one or more processors to perform actions comprising:
receiving a registration request associated with a user equipment (UE);
determining that content of the registration request comprises a subsidiary request and an indication of a request type of the subsidiary request; and
at least partially in response to determining that the content of the registration request comprises the subsidiary request, transmitting an indication of the subsidiary request having the request type on behalf of the UE via the telecommunications network.

* * * * *